US006994789B2

(12) United States Patent
Sale et al.

(10) Patent No.: US 6,994,789 B2
(45) Date of Patent: Feb. 7, 2006

(54) PRE-METERED, UNSUPPORTED MULTILAYER MICROPOROUS MEMBRANE

(75) Inventors: Richard Sale, Tolland, CT (US); Eugene Ostreicher, Farmington, CT (US)

(73) Assignee: CUNO Incorporated, Meriden, CT (US)

( * ) Notice: Subject to any disclaimer, the term of this patent is extended or adjusted under 35 U.S.C. 154(b) by 0 days.

(21) Appl. No.: 10/771,801

(22) Filed: Feb. 4, 2004

(65) Prior Publication Data

US 2004/0154978 A1 Aug. 12, 2004

Related U.S. Application Data

(63) Continuation-in-part of application No. 10/072,202, filed on Feb. 7, 2002, now Pat. No. 6,736,971, and a continuation-in-part of application No. 09/923,640, filed on Aug. 7, 2001, now Pat. No. 6,706,184.

(60) Provisional application No. 60/223,359, filed on Aug. 7, 2000.

(51) Int. Cl.
*B01D 29/46* (2006.01)
(52) U.S. Cl. .......................... 210/500.27; 210/500.41; 210/500.42; 210/490
(58) Field of Classification Search ................ 210/490, 210/500.27, 500.42, 500.38, 500.41, 500.22, 210/500.36; 264/41; 427/244, 245
See application file for complete search history.

(56) References Cited

U.S. PATENT DOCUMENTS 3,876,738 A  4/1975 Marinaccio et al.

(Continued)

FOREIGN PATENT DOCUMENTS

WO   WO 93/22034   11/1993

(Continued)

OTHER PUBLICATIONS

ASTM (American Society fot Testing and Materials)—Designation: E 1294-89 (Reapproved 1999) Standard Test Method for Pore Size Characteristics of Membrane Filters Using Automated Liquid Porosimeter.

(Continued)

*Primary Examiner*—Ana Fortuna
(74) *Attorney, Agent, or Firm*—R. Thomas Payne; John A. Tomich

(57) ABSTRACT

An at least two layer, unsupported, continuous microporous membrane is disclosed. The at least two layer, unsupported, continuous microporous membrane may include at least two different membrane pore size layers or the pore sizes may have about the same pore size. Apparatus and processes for fabricating at least a two layer unsupported, continuous, microporous membrane are also disclosed. One representative process disclosed for forming a continuous, unsupported, multilayer phase inversion microporous membrane having at least two layers comprises of the acts of: operatively positioning at least one dope applying apparatus, having at least two polymer dope feed slots, relative to a continuous moving coating surface; applying polymer dopes from each of the dope feed slots onto the continuously moving coating surface so as to create a multiple layer polymer dope coating on the coating surface; subjecting the multiple dope layer to contact with a phase inversion producing environment so as to form a wet multilayer phase inversion microporous membrane; and then washing and drying the membrane. Other representative apparatuses and processes are also disclosed.

14 Claims, 16 Drawing Sheets

U.S. PATENT DOCUMENTS

| | | | |
|---|---|---|---|
| 3,948,823 A * | 4/1976 | Lee et al. .................... | 521/62 |
| 4,001,024 A | 1/1977 | Dittman et al. | |
| 4,203,847 A | 5/1980 | Grandine, 2nd | |
| 4,203,848 A | 5/1980 | Grandine, II | |
| 4,340,479 A | 7/1982 | Pall | |
| 4,340,480 A | 7/1982 | Pall et al. | |
| 4,489,671 A | 12/1984 | Choinski | |
| 4,629,563 A | 12/1986 | Wrasidlo | |
| 4,645,602 A | 2/1987 | Barnes, Jr. et al. | |
| 4,707,265 A | 11/1987 | Barnes, Jr. et al. | |
| 4,770,777 A | 9/1988 | Steadly et al. | |
| 4,774,039 A | 9/1988 | Wrasidlo | |
| 4,849,671 A | 7/1989 | Fendley | |
| 4,854,262 A | 8/1989 | Chino et al. | |
| 4,933,081 A | 6/1990 | Sasaki et al. | |
| 5,171,445 A | 12/1992 | Zepf | |
| 5,188,734 A | 2/1993 | Zepf | |
| 5,256,357 A | 10/1993 | Hayward | |
| 5,433,859 A | 7/1995 | Degen | |
| 5,500,167 A | 3/1996 | Degen | |
| 5,620,790 A | 4/1997 | Holzki et al. | |
| 5,741,549 A | 4/1998 | Maier et al. | |
| 5,834,107 A | 11/1998 | Wang et al. | |
| 5,962,075 A | 10/1999 | Sartor et al. | |
| 6,040,392 A | 3/2000 | Khanna et al. | |
| 6,090,441 A | 7/2000 | Vining et al. | |
| 6,126,826 A | 10/2000 | Pacheco et al. | |
| 6,146,747 A | 11/2000 | Wang et al. | |
| 6,264,044 B1 | 7/2001 | Meyering et al. | |
| 6,280,791 B1 | 8/2001 | Meyering et al. | |
| 6,413,070 B1 | 7/2002 | Meyering et al. | |
| 6,536,605 B2 | 3/2003 | Rice et al. | |
| 6,536,606 B2 | 3/2003 | Schneider et al. | |
| 6,706,184 B2 * | 3/2004 | Sale et al. ............ | 210/500.27 |
| 2003/0209485 A1 * | 11/2003 | Kools ................... | 210/490 |
| 2004/0084364 A1 * | 5/2004 | Kools ................... | 210/490 |

FOREIGN PATENT DOCUMENTS

| | | |
|---|---|---|
| WO | WO 99/47246 | 9/1999 |
| WO | WO 01/89673 | * 11/2001 |
| WO | WO 02/11868 | 2/2002 |

OTHER PUBLICATIONS

Taylor, Shawn David, "Two Layer Slot Coating Study of Die Geometry and Interfacial Region," Master Thesis, McMaster University, Hamiltion, Ontario, Canada, Jul. 1997.

Kistler, Stephan F. et al, Editors, "Liquid Film Coating," Scientific Principles and Their Technical Implications, Chapman & Hall, 1997.

* cited by examiner

Figure 4. 0228sd67.5

Figure 5. Cross-section of 0410S67.5

Figure 6. Close-up of 0410S67.5

Figure 10. Cross section of 0508lam

Figure 11. Close up of Figure 10

Figure 13. Cross-section of membrane # 0103

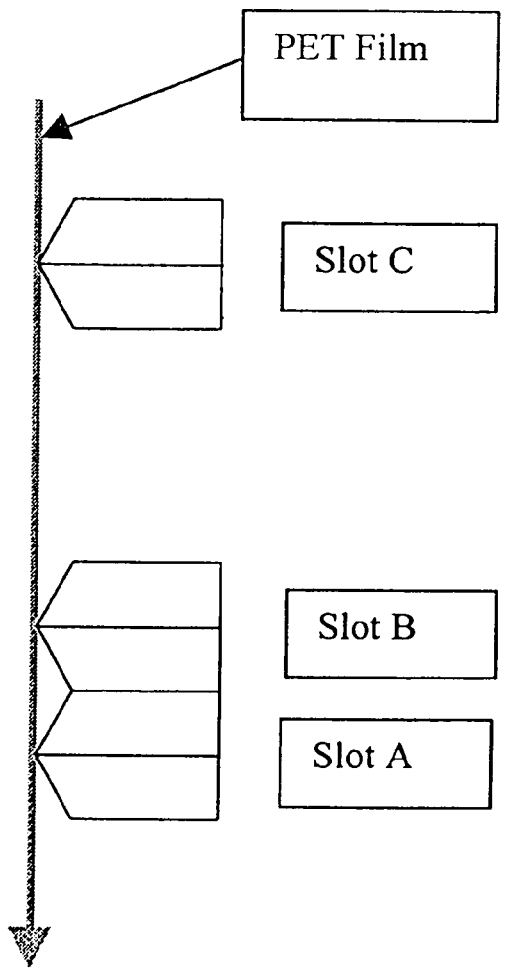
Figure 15. Order of dope application: slot C, B, A

PRE-METERED, UNSUPPORTED MULTILAYER MICROPOROUS MEMBRANE

RELATED APPLICATIONS

This application is a continuation-in-part of commonly owned U.S. patent application Ser. No. 10/072,202, filed Feb. 7, 2002 of Sale et al., now U.S. Pat. No. 6,736,971 entitled "Pre-metered, Unsupported Multilayer Microporous Membrane," U.S. patent application Ser. No. 09/923,640, filed Aug. 7, 2001 of Sale et al., now U.S. Pat. No. 6,706,184 entitled "Unsupported Multizone Microporous Membrane," which is a continuation-in-part of commonly owned U.S. Provisional Patent Application Ser. No. 60/223,359, filed Aug. 7, 2000, of Sale et al., entitled "Unsupported Multizone Microporous Membrane," the disclosure of each is herein incorporated by reference to the extent not inconsistent with the present disclosure.

BACKGROUND OF THE DISCLOSURE

The present disclosure relates to continuous, unsupported, microporous membranes having two or more distinct, but controlled pore sizes and to processes of making and using same, more particularly to unsupported microporous membranes made from a first dope and at least one additional dope being applied directly to one another prior to the at least two dopes being quenched and to apparatus for manufacturing and processes for making such membrane.

Microporous phase inversion membranes are well known in the art. Microporous phase inversion membranes are porous solids which contain microporous interconnecting passages that extend from one surface to the other. These passages provide tortuous tunnels or paths through which the liquid which is being filtered must pass. The particles contained in the liquid passing through a microporous phase inversion membrane become trapped on or in the membrane structure effecting filtration. The particles in the liquid that are larger than the pores are either prevented from entering the membrane or are trapped within the membrane pores and some particles that are smaller than the pores are also trapped or absorbed into the membrane pore structure within the pore tortuous path. The liquid and some particles smaller than the pores of the membrane pass through. Microporous phase inversion membranes have the ability to retain particles in the size range of from about 0.01 or smaller to about 10.0 microns or larger.

Many important micron and submicron size particles can be separated using microporous membranes. For example, red blood cells are about eight (8) microns in diameter, platelets are about two (2) microns in diameter and bacteria and yeast are about 0.5 microns or smaller in diameter. It is possible to remove bacteria from water by passing the water through a microporous membrane having a pore size smaller than the bacteria. Similarly, a microporous membrane can remove invisible suspended particles from water used in the manufacture of integrated circuits in the electronics industry.

Microporous membranes are characterized by bubble point tests, which involve measuring the pressure to force either the first air bubble out of a fully wetted phase inversion membrane (the initial Bubble Point, or "IBP"), and the higher pressure which forces air out of the majority of pores all over the phase inversion membrane (foam-all-over-point or "FAOP"). The procedures for conducting initial bubble point and FAOP tests are discussed in U.S. Pat. No. 4,645,602 issued Feb. 24, 1987, the disclosure of which is herein incorporated by reference to the extent not inconsistent with the present disclosure. The procedure for the initial bubble point test and the more common Mean Flow Pore tests are explained in detail, for example, in ASTM F316-70 and ANS/ASTM F316-70 (Reapproved 1976) which are incorporated herein by reference to the extent not inconsistent with the present disclosure. The bubble point values for microporous phase inversion membranes are generally in the range of about two (2) to about one hundred (100) psig, depending on the pore size and the wetting fluid.

An additional method which describes a pore measurement technique is ASTM E1294 89 which describes a method for determining pore size by clearing fluid from the pores of the membrane and measuring the resulting flow. This method is used to measure mean flow pore but is similar to the method of Forward Flow Bubble Point in that the wet portion of the test uses a similar protocol.

The Forward Flow Bubble Point (FFBP) test is described in U.S. Pat. No. 4,341,480 by Pall et. al., the disclosure of which is herein incorporated by reference to the extent not inconsistent with the present disclosure. This patent discloses how the FFBP can be used to distinguish a symmetric membrane from an asymmetric membrane. The FFBP curve is generated by saturating the membrane with fluid and subjecting one side to a rising air pressure while measuring air flow on the downstream side. For a single layer symmetric membrane with a well defined pore size, a plot of air flow versus pressure remains flat but slightly above zero due to diffusion through the liquid in the membrane. When the pressure reaches a point when it can overcome the surface tension of the fluid in the pore, the air will push the liquid out of the pore and air will flow through the pore in bulk (bulk flow). This pressure point is a function of the surface tension of the liquid and the radius of the pore as defined by the equation of Young and Laplace (see Physical Chemistry of Surfaces by Arthur Adamson, Wiley Press), When the pores all have essentially the same size, this event occurs simultaneously and is characterized by a transition of the flow versus pressure curve from horizontal (when diffusion flow is predominant) to vertical (where bulk flow is dominant), this type of FFBP characteristic is shown in FIG. 9. FIG. 9 also demonstrates that the FFBP characteristics for a single layer symmetric membrane are identical regardless of membrane orientation.

On the other hand, asymmetric membranes are characterized by a gradual change in pore size throughout the thickness and exhibits a different FFBP curve. When tested with the large pore size surface facing up stream against the applied air pressure. Since the pore size is gradually changing throughout the thickness depth, the pressure required to push fluid down the pores rises gradually and the resulting FFBP curve has a rising slope until the final bubble point is reached and bulk flow occurs. While an asymmetric membrane might be retentive, the above response is indistinguishable from an asymmetric membrane with defects, where certain pores are significantly larger than the remaining pores and exhibit bulk flow at lower pressure. The FFBP response of this type of membrane also exhibits a rising slope when flow versus pressure is plotted.

U.S. Pat. No. 3,876,738, the disclosure of which is herein incorporated by reference to the extent not inconsistent with the present disclosure, describes a process for preparing microporous membranes by quenching a solution of a film-forming polymer in a non-solvent system for the polymer. U.S. Pat. No. 4,340,479, the disclosure of which is herein incorporated by reference to the extent not inconsistent with the present disclosure, generally describes the preparation of skinless microporous polyamide membranes by casting a polyamide resin solution onto a substrate and quenching the resulting thin film of polyamide.

There is an extensive body of knowledge concerning the production of multiple layer films using pre-metered coating technology, such as, for example, slot dies, as taught by. This prior art deals with the extrusion of films that are essentially impermeable. This prior art also discusses manufacture of both photographic film and films used in the packaging industry (e.g. food packaging). Some examples of patents, each of which are herein incorporated by reference to the extent not inconsistent with the present disclosure, disclosing multilayer films are listed in the table below:

| Patent | Issued | Inventor(s) | Title |
|---|---|---|---|
| U.S. Pat. No. 6040392 | 2000 | Khanna et. al. | Nylon 6 or 66 Based Compositions and Films Formed Therefrom Having Reduced Curl. |
| U.S. Pat.No. 5962075 | 1999 | Sartor et. al. | Method of Multilayer Die Coating Using Viscosity Adjustment |
| U.S. Pat.No. 5741549 | 1998 | Maier et. al. | Slide Die Coating Method and Apparatus with Improved Die Tip |
| U.S. Pat.No. 5256357 | 1993 | Hayward | Apparatus and Method for Cocasting Film Zones |
| U.S. Pat.No. 4854262 | 1989 | Chino et. al. | Coating Apparatus |
| U.S. Pat.No. 4001024 | 1977 | Dittman et. al. | Method of Multilayer Coating |

At least some of the above prior art teaches the use of pre-metered dies to apply coatings in the production of essentially non-porous films. Discussion of pre-metered dies can be found in two Troller Schwiezer Engineering (TSE) publications, "Concepts and Criteria for Die Design" and "Precision Coating: Pre-metered and Simultaneous Multilayer Technologies, " which are available from TSE upon request. Pre-metered coating methods comprise slot, extrusion, slide and curtain coating. Pre-metered coating processes are characterized by the fact that the down-web thickness of the coated layer is solely determined by the ratio of volumetric flow rate/width of fluid pumped into the die to the speed of the web. A discussion of multiple slot dies are also presented in a Master Thesis written by Shawn David Taylor titled Two-Layer Slot Coating: Study Of Die Geometry And Interfacial Region at McMaster University dated July 1997, the disclosure of which is hereby incorporated by reference to the extent not inconsistent with the present disclosure.

Other art involves the manufacture of microporous membranes by other techniques. Grandine provides the first practical disclosure of the manufacture of PVDF membrane. The Grandine patent (U.S. Pat. No. 4,203,847) discloses, although does not claim, that thermal manipulation of the dope will lead to a change in pore size of the resulting membrane. Surprisingly, given that nylon is a very different polymer that is dissolved in ionic organic acids rather than an organic ketone, it experiences a similar phenomenon. Grandine did not suggest a mechanism for this phenomenon to indicate that it might be general for polymers used to make membranes.

Subsequent patents relating to PVDF disclose methods for making asymmetric PVDF membrane. The Wang patent (U.S. Pat. No. 5,834,107) discloses a variety of methods to manufacture asymmetric membrane. Other patents that are related to asymmetric structure and which are cited in the Wang patent are Costar (WO 93/22034), Sasaki (U.S. Pat. No. 4,933,081), Wrasidlo (U.S. Pat. No. 4,629,563 & U.S. Pat. No. 4,774,039), and Zepf (U.S. Pat. Nos. 5,188,734 & 5,171,445).

Asymmetric membrane prior art does not disclose, suggest or teach independent control of the properties of each zone (such as thickness or pore size) nor the formation of distinct layers or two distinct polymer dopes.

Other prior art is the use of thermal manipulation to create distinct zones of controlled pore size with nylon membrane by Meyering et. al. as disclosed in (PCT publication WO 99/47246, the disclosure of which is incorporated herein by reference to the extent not inconsistent with the present disclosure) applying two layers of dope against opposite sides of a support scrim after the scrim was filled with a first dope. In some applications, especially pleated cartridge filters, Nylon is an intrinsically weak material which requires the use of a scrim to function in particular applications effectively, but unreinforced or unsupported nylon is used in other applications. The presence of the reinforcing or supporting scrim requires multiple dies, one to provide dope within and to fill the scrim for the middle membrane zone and the other two dies to apply the dope for the outer two membrane zones. In order for the Meyering process to effectively operate, a centrally positioned porous support which remains with the finished membrane is clearly required regardless of whether or not the membrane polymer requires the support for a particular end use application.

Additional prior art is Degen (U.S. Pat. No. 5,500,167) which also claims a supported membrane with a porous nonwoven fibrous support wherein the two zones of the membrane are divided into zones of different pore sizes. In that case, a second dope layer to form a second zone is applied to a first dope layer in a secondary, sequential operation with the scrim partially outboard of the two finished zones.

Additional prior art is Holzki U.S. Pat. No. 5,620,790 which describes a multilayer membrane applied with a doctor blade but is subject to the restriction that the viscosity of the first layer in the polymer solution form must be greater or equal to the viscosity of subsequent layers. This viscosity restriction require either solids manipulations or the addition of viscosity enhancing agents to control membrane formation. Adulteration of the polymer solution in this manner is less desirable than a technique which is not sensitive to viscosity differences between the layers.

Tkacik U.S. Pat. No. 5,228,994 mentions in passing, although does not claim, that membranes may be coextruded in a multilayer sequence (column 3 line 46–50) prior to either layer being phase inverted. However, the examples only reference methods that are suitable for coating a polymer solution layer to a already formed substrate, which is the main topic of the patent. This patent does not disclose a method to produce a multilayer membrane where neither layer has previously been subjected to phase inversion.

Steadly U.S. Pat. No. 4,770,777 deals with skinned multilayer membranes made by a post-metering process.

PCT publication WO 01/89673 A2 to Kools, the disclosure of which is herein incorporated by reference to the extent not inconsistent with the present disclosure, appears to disclose 'co-casting' as a method to make multilayer PVDF membrane. Having as it's salient point post-metering coating apparatus which apparently results in high interfacial shear turbulence which results in an asymmetric transition zone, having a different pore size from either of the two adjacent layers, in the interface zone. It is believed that the Kools structure, as disclosed will result in the undesirable FFBP as discussed below.

All of these preceding methods disclose the use post-metering processes, which utilize apparatus, such as, for example, casting knives or doctor blades to produce membranes, whether they are single or multi-layer. The casting knife is a post-metered approach where the thickness of the applied polymer solution is controlled by the application of a device, such as, for example, a spreading bar in contact with the top surface layer of the coated material as it is applied to the substrate. These methods suffer from the limitation that they create an asymmetric region at the interface presently believed due to the shear action of post-metered coating apparatus.

Another approach to joining two different membrane zones together so as to produce a multilayer membrane is wet laminating wherein membrane precursors that have been cast and quenched but not dried are joined under mild pressure and then dried together. When the pore sizes are different from each other and both layers are symmetric, the asymmetric transition is eliminated and a desirable FFBP curve response is generated, as shown in FIG. 8. However, wet lamination is prone to delamination, which can be a particular concern if the membrane is back-flushed. As a practical matter, laminated multilayer membranes tend to be thicker than single zone membranes since each zone is an independently, individually prepared membrane which included being quenched prior to being laminated together to form the multilayer membranes. These prior art membranes are clearly relatively thick, as each zone of the laminated multilayer membrane must be individually sufficiently thick in order to survive the membrane manufacturing process and then be joined with at least one other individual sufficiently thick membrane, individually and separately prepared, to form a multilayer laminated membrane.

Prior art on pre-metered application technology, which includes the use of slot dies, prior art on generally does not deal with and is not believed to have been applied to the manufacture of microporous membranes nor its requirements for the manufacture of microporous membranes with the exception of the Meyering et al. disclosure mentioned above.

Thus, there is a need for unsupported or scrimless, multilayer polymeric microporous membrane having at least two independent and distinct pore size layers which progressing through the thickness of the membrane, each layer being continuously joined to its' adjacent layer throughout the membrane structure. Such a multilayer membrane should eliminate the need for reinforcing or supporting scrim while realizing the advantages of multilayer filtration control. Such a scrimless multilayer membrane should have at least two separate layers that are continuously joined by the molecular entanglement that occurs in the liquid between the two dope layer prior to phase inversion but with a sharp pore size transition between the two layers. Such a multilayer scrimless membrane should be preferably as thin as prior art single layer membranes and thinner than prior art laminated multilayer membranes. Such a membrane should exhibit a FFBP curve such that it can be distinguished from a defective membrane.

SUMMARY OF THE DISCLOSURE

The present disclosure is directed to unsupported (without an integral reinforcing or supporting porous support) multilayer microporous membrane, apparatuses and processes for the manufacture thereof. The unsupported membrane may be substantially simultaneously formed into multiple (two or more) discrete layers, each with, presently preferably, a different but controlled pore size. The unsupported membrane may also comprise multiple (two or more) discrete layers each with, presently preferably, a different but controlled pore size, with a distinct change in pore size at the interface between each of the layers that does not exhibit locally asymmetric pore size distributions, such that the resulting membrane exhibits a Type I Forward Flow Bubble Point (FFBP) curve response, as illustrated in FIGS. 16a and 16c, and demonstrated in FIG. 12 and discussed below.

Layers of dope that eventually form the layers are applied directly to one another prior to the membrane quench such that interfacial turbulence and gross mixing between adjacent layers are avoided, maintaining distinct pore sizes within the separate layers but where the separate layers are integrally joined at each interface. A multilayer membrane structure results from the process step of applying the individual dopes or polymer solutions that form each of the layers sequentially onto one another, the resulting multilayer liquid coating, subsequent to being subjected to a process step that induces phase inversion that forms the distinctly sized pores in each layer, with each porous layer being physically bonded to its' adjacent porous layer by polymer intermingling, at a molecular scale, at the interface but without any extensive intermixing in the interfacial regions between the layers, as will be explained in more detail below.

The application is, presently preferably achieved, with a pre-metered coating system which does not introduce any significant shear turbulence at the interface between adjacent dope or polymer solution layers. The present applicants have determined that this absence of significant shear turbulence is in contrast to a post-metered coating system, such as knife coating, which has now been determined to create significant shear turbulence between each of the applied liquid layers, as discussed in the Kools publication. The applicants of the present disclosure believe that they have replicated the Kool's post-metering process to produce a two layer membrane. The FFBP of the Kool's membrane resembles that shown in FIG. 7. In light of FIGS. 16b and 16d, the interface of Kool's process appears to indicate the presence of a significant asymmetric zone at the interface. The results obtained appear to verify the disclosure as contained in the Kools publication.

This discernable transition layer occurs whether the two dope or liquid polymer layers are applied by two separate casting knives located some distance apart, as in one experiment, or whether the two casting knifes are built into a single assembly so that there is essentially zero gap between the two polymer solution applications, as disclosed in the Kool's publication.

The TSE documents cited previously and the Book, "Liquid Film Coating," edited by Stephen F. Kistler and Peter M. Schweizer, Chapman and Hall USA 1997," the disclosure of which is herein incorporated by reference to the extent not inconsistent with the present disclosure, lists a number of pre-metered coating processes. These pre-metered coating processes are identified as, but are not limited to, slot coating, extrusion coating, slide coating, and curtain coating. While all of these process are capable of producing multilayer polymer solution coatings without any significant interfacial shear turbulence, it is anticipated that for the production rates typically employed to produce membrane and a typical viscosity of polymer solutions in the 1000 to 5000 cP range, that slot coating process will be preferred.

The concept taught could be applied to nylon, PVDF, PES, PP or any membrane component or polymer capable of producing a phase inversion membrane wherein pore size can be controlled or predetermined through specific control of the polymer solution or dope preparation, which may include formulation of constituents, thermal manipulation, or use of any other pore size controlling steps known to the art prior to the coating process step.

The present disclosure claims, among other innovations, the process of coating multiple layers of polymer solutions, each having been controlled to eventually produce a predetermined pore size when subjected to phase inversion on to a moving nonporous self-releasing substrate with each layer applied with a pre-metering device such as, for example, a slot die and then subjecting such multiple fluid layers to a phase inversion process in, for example, a nonsolvent or solvent/nonsolvent liquid bath in such a manner as to produce an unsupported, multilayer microporous membrane precursor having multiple pore size layers. The moving coating surface material, presently preferably, a nonporous self-releasing support with each layer applied with a pre-metered die is selected so that it is compatible with the dope or polymer solution and will self-release from the wet microporous membrane precursor after the phase inversion process.

It is further contemplated that the individual layers may vary from each other in other functional aspects other than pore size, where interlayer mixing must be avoided. Such differences between layers may include polymer end group functionality, polymer composition (use of copolymers), particulate fillers, additives, different molecular weight, wetting characteristics (hydrophilic and hydrophobic), or other functional layer differences, wherein such differences are intrinsic to the individual dopes used to form each of the layers and interlayer mixing must be avoided.

One aspect of the present disclosure includes a process for forming a continuous, unsupported, multilayer phase inversion microporous membrane having at least two distinct symmetrically distributed pore size layers, comprising of the acts of: operatively positioning at least one pre-metering dope applying apparatus capable of applying at least two independently pre-metered polymer dopes relative to a continuously moving nonporous support coating surface; cooperatively applying the pre-metered polymer dopes onto the continuously moving nonporous support coating surface so as to create a multilayer polymer dope coating on the nonporous support coating surface; and subjecting the multilayer dope coating to contact with a phase inversion producing environment so as to form a wet multilayer phase inversion microporous membrane precursor, and then washing and drying this wet precursor structure to form the desired dry multilayer microporous membrane.

Another aspect of the present disclosure includes a process for forming a continuous, unsupported, multilayer phase inversion microporous membrane having at least two layers, comprising of the acts of: operatively positioning at least two pre-metering dope applying or coating apparatus, each capable of independently applying at least one polymer dope, relative to a nonporous support coating surface; sequentially applying polymer dopes from each of the pre-metering dope applying or coating apparatus onto the nonporous support coating surface so as to create a multilayer polymer dope coating on the nonporous support coating surface; and subjecting the sequentially applied polymer dopes to contact with a phase inversion producing environment so as to form a wet multilayer phase inversion microporous membrane precursor, washing and drying said precursor to form the desired dry multilayer microporous membrane.

Still another aspect of the present disclosure includes a multilayer, unsupported, microporous membrane comprising: a first layer having a symmetrically distributed first pore size; and at least a second layer having a symmetrically distributed second pore size, the first and second layers being operatively connected with a distinct change in pore size at the interface thereof such that the multilayer membrane is continuous and does not include any support material.

BRIEF DESCRIPTION OF THE DRAWINGS

FIG. 15 is a schematic view of a representative apparatus useful to produce membrane according to the present disclosure;

DETAILED DESCRIPTION OF THE DISCLOSURE

Figure 16A:
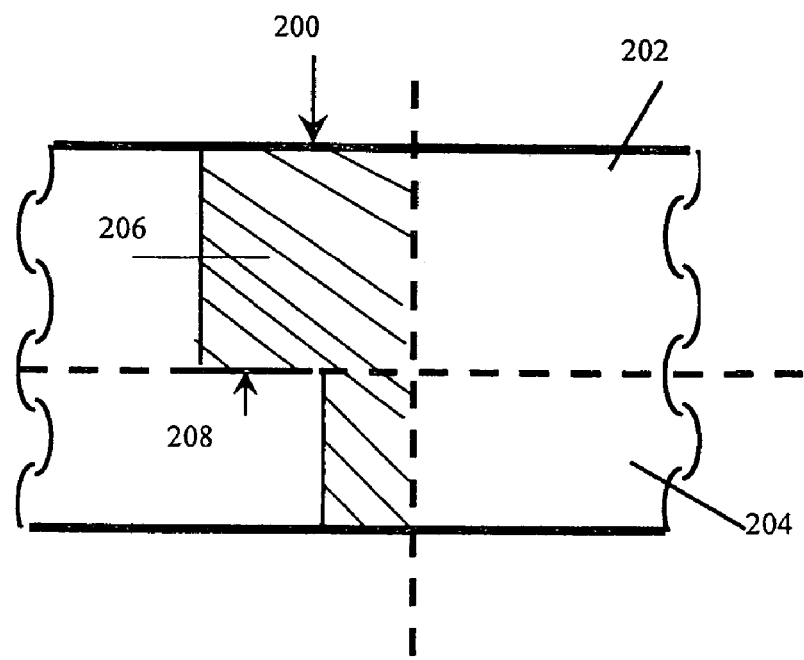
FIG. 16a is a graphic illustration of a Type I Multilayer Membrane formed by a Pre-Metering Process

The microporous membrane and the methods for producing same as disclosed herein can also be characterized by a FFBP curve, as illustrated in FIGS. 16a–6d. As the result of further consideration of the experiments included in the parent application, we have discovered that certain multilayer membrane, although they may appear multilayer with SEM analysis, will exhibit a degree of asymmetry if produced by prior art methods described below. However, as will be apparent from the present disclosure, products and methods that produce the disclosed multilayer membrane eliminates this asymmetry.

The following define specific terms, as they are understood to be used in the present disclosure.

By the term "polymer dope(s)" or "dope(s)," we mean a polymer dissolved in a solvent, or in a miscible solvent/non-solvent combination such that polymer dope(s) will form a pore structure when subjected to a phase inversion process.

By the term "phase inversion process," we mean a process of exposing a polymer dope to a controlled environment that provides for controlled interdiffusion of dope, solvent, and/or nonsolvents into or out of the membrane in response to phase inversion so as to induce liquid-liquid demixing so as to form a pore structure. Phase inversion is a necessary step in the formation of microporous membrane. The process is induced by a number of mechanisms well known to those versed in the art. Examples of phase inversion include but are not limited to: contacting the polymer dope coating to a solution of solvent and nonsolvent containing a higher percentage of nonsolvent than the dope solution; thermally induced phase inversion; exposing membrane to a vapor interface and evaporating the solvent from the dope coating.

By the term "coating surface," we mean a very smooth flat essentially impermeable non-porous surface support that the dope will wet but from which the wet microporous multilayer membrane precursor will readily release after the phase inversion process. Suitable non-porous surface support coating surfaces can be, such as, for example, a belt or a drum, disposable or reusable, and made from materials such as PET film or stainless steel. We would anticipate that a flexible coating surface would require additional support (for example rollers underneath a smooth flexible belt) to properly position the coating surface at the point(s) of application of the multiple polymer solution coatings.

By the term "unsupported multilayer membrane," we mean membrane without an integral porous support or scrim in which each dope layer is applied to the coating surface by one or more pre-metering dope applying or coating apparatus. The resulting layers are subjected to a phase inversion process, separated from the support, washed and then dried. Suitable processes for the washing and drying are well known in the art. References to the wet microporous multilayer membrane precursor characterize the intermediate product, after phase inversion, but just prior to the washing and drying step.

By the term "cooperatively applying polymer dopes," we mean that the multiple coating dope layers form cooperatively in such a manner that there is hydrodynamic equilibrium i.e., there is no significant interfacial shear turbulence between the two liquid layers.

By the term "dope applying apparatus," we mean pre-metering devices that operatively transfers polymer dope to a coating surface such that the thickness of the transferred dope is substantially controlled through control of the solution feed rate and the coating surface speed and is not dependent upon the gap between the coating surface and the pre-metering apparatus. Examples of such devices include, but are not limited to, slot dies, extrusion dies, slide dies, or curtain dies and other structures which prove capable of performing the function of the representative examples above.

By the term "substantially, simultaneously coating multiple fluid layers," we mean that multiple dopes are applied to the coating surface in such a manner so that no significant evaporation of solvent is allowed to occur between the application of each succeeding dope layer. This limiting of solvent evaporation is best achieved by using low volatility solvents.

Figure 16C:
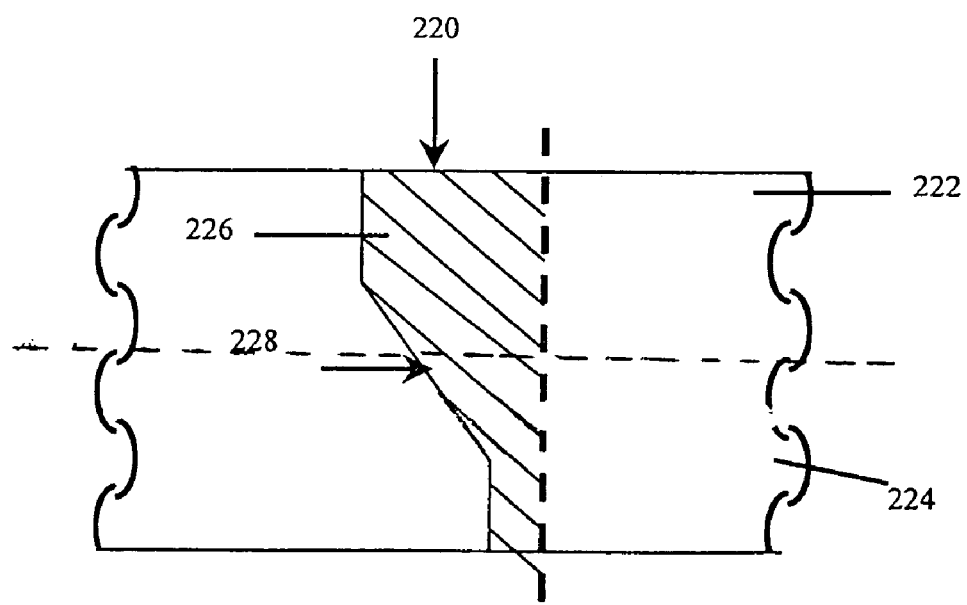
FIG. 16c is a graphic illustration of a Type I Multilayer Membrane FFBP test results.
Figure 16B:
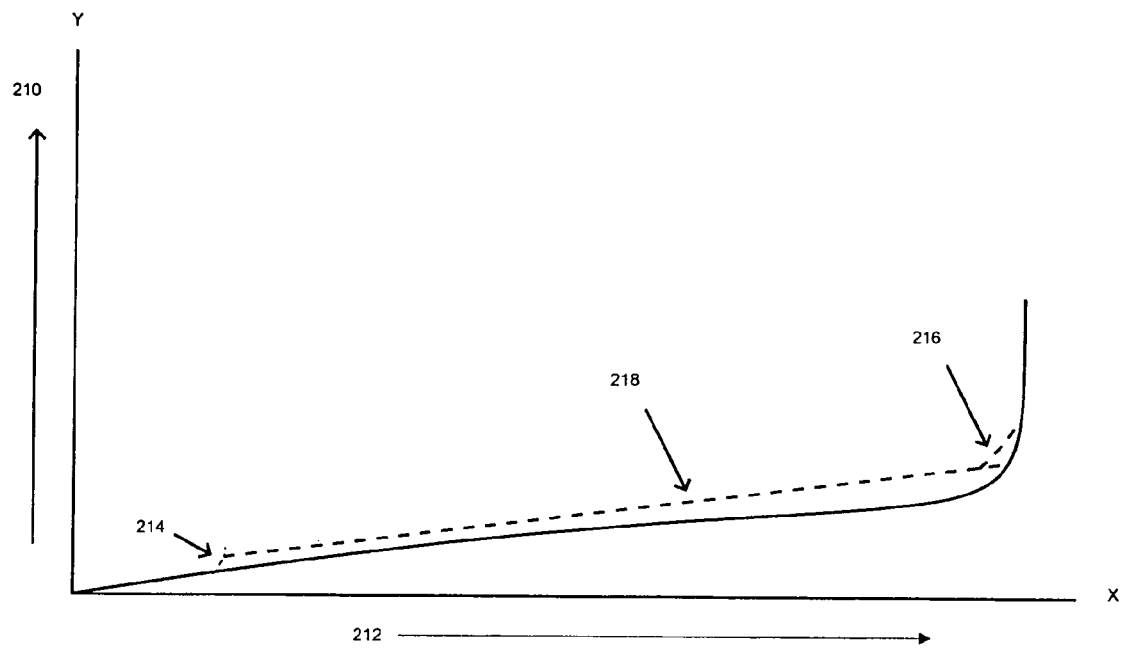
FIG. 16b is a graphic illustration of a Type II Multilayer Membrane formed by a Pre-Metering Process.
Figure 16D:
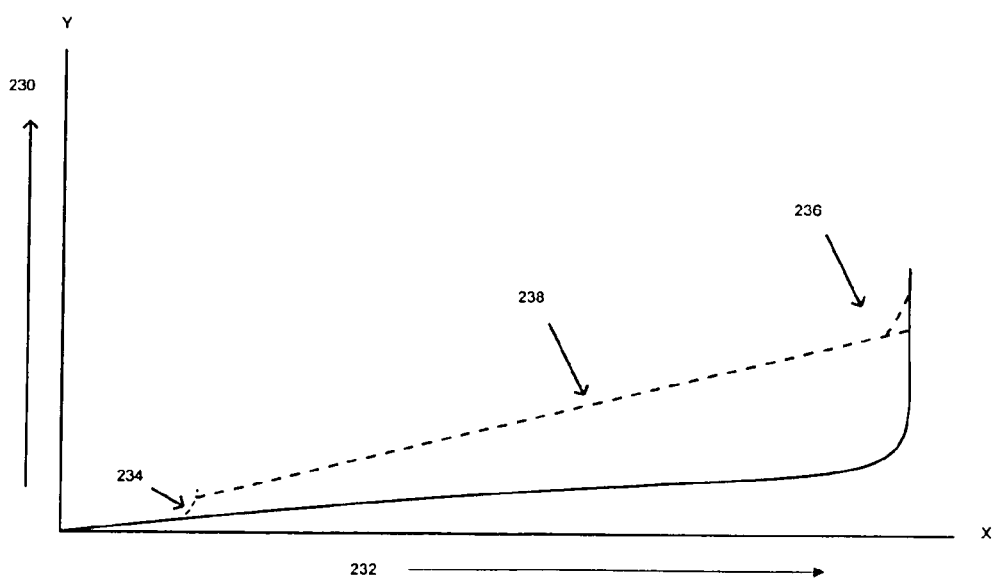
FIG. 16d is a graphic illustration of a Type II Multilayer Membrane FFBP test results.

By the term "acceptable Forward Flow Bubble Point (FFBP) curve for a multilayer membrane" we mean a curve that essentially conforms to the Type I characteristics as shown in FIGS. 16a and 16c, demonstrating the presence of distinct and symmetric pore size distributions in each of the membrane layers as opposed to the clear transition zone illustrated by a Type II characteristics as shown in FIGS. 16b and 16d.

As part of ongoing efforts to more fully understand the phenomenon of the phase inversion formation of microporous membrane, applicants have recently recognized, through the continuous evaluation of the experimental data, including the data disclosed in the parent application, and astute observation thereof that multilayer unsupported microporous membrane made with post-metering devices appears to have a transition layer with pore sizes that are different from those of the two constituent layers at the interface between the two layers and that this is believed, at least partially, caused by shear turbulence forces resulting from the post-metering application of each layer.

Figure 1:
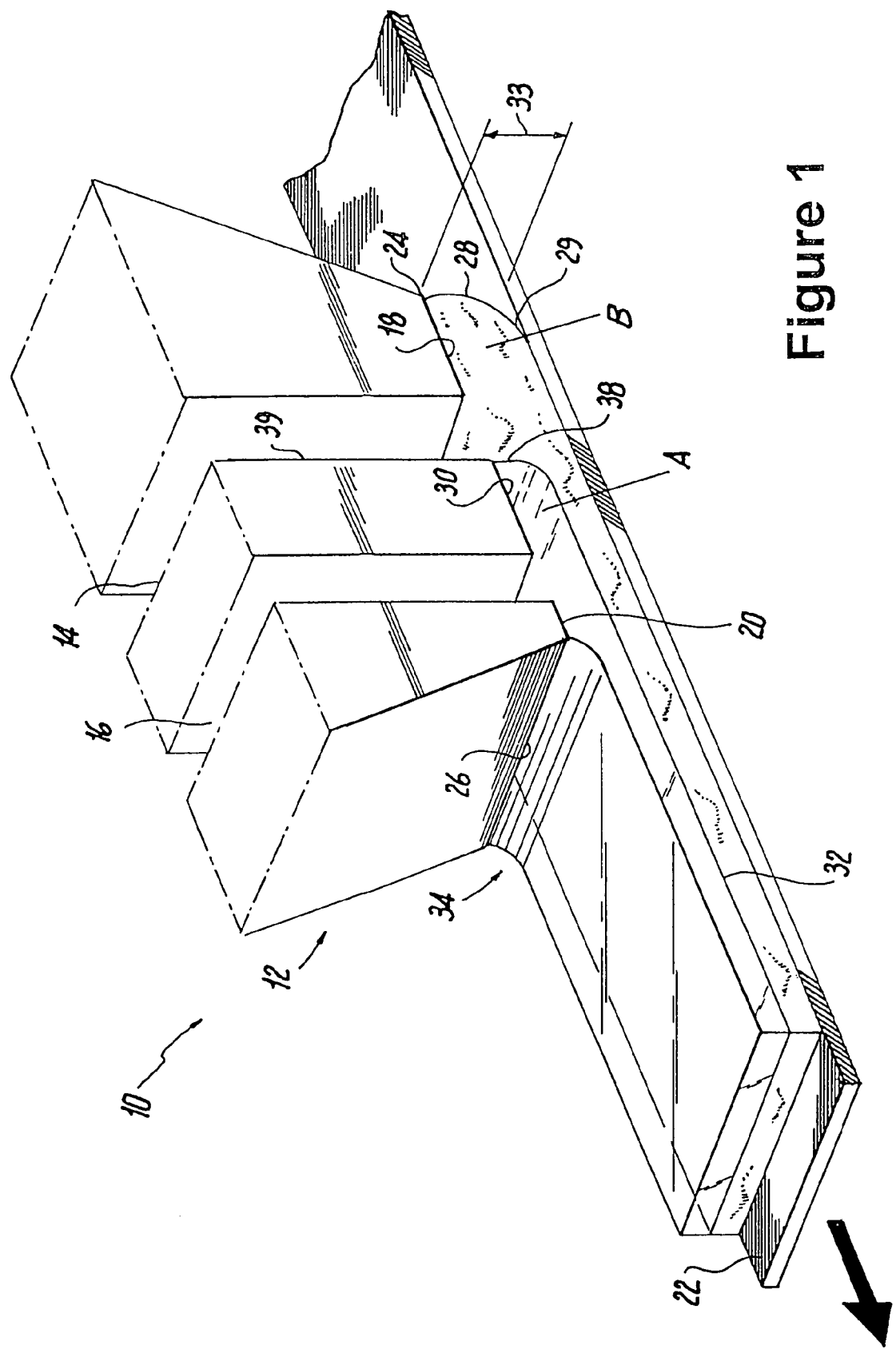
FIG. 1 is a perspective view of a representative die useful to produce membrane according to the present disclosure.

As shown in FIG. 1, a representative system 10 for producing an at least a two-layer, multilayer unsupported microporous membrane is illustrated. As shown, the representative system comprises a representative pre-metering device, such as, for example, a slot die (schematically shown) having at least two feed slots 14, 16. The die has an upstream die lip 18 and a downstream die lip 20. When dope is being applied to a moving coating surface or web 22, and dopes A and B are exiting their respective feed slots 16, 14, at controlled pumped flow rates, there is no significant shear turbulence being produced between the support surface 22 and the first polymer dope solution (B) layer, or between the upper interface of the first polymer dope solution (B) layer and the lower interface of the second polymer dope solution (A) layer and two static contact lines 24, 26, are formed as illustrated.

As shown, when the coating surfaces or web 22 is moving in the direction as shown for web direction, dope B, which is being fed from a location by any one of a plurality of known means, is deposited on the coating surface and forms an upstream meniscus 28 and a down stream meniscus 34 at a dynamic contact line 29. As the coating surface 22 moves, the dope B that is deposited thereon is also moving at essentially the same speed and in the same direction as the coating surface so that there is no significant shear turbulence produced between the polymer solution B and the coating surface in the direction of the web. An additional dope A from the second feed slot 16 is fed, with the feed slots being divided by a center die lip 30 is then applied onto the top of the first dope B for a distance, shown as the coating gap 32, between the downstream die lip 20 and the dynamic contact line 29. The application of at least this second dope A from at least the second feed slot 16 is conducted at a flow rate such that interfacial shear turbulence is essentially eliminated between the two layers A, B. Once these layers A, B are in intimate contact at the interface 32, there is a molecular level intermingling of the extended polymer chains that results in the subsequent formation of a continuous polymer structure during phase inversion. The absence of shear turbulence at the interface prevents any gross mixing of the two polymer solutions. The interaction at the molecular level is described in U.S. Pat. No. 6,090,441 of Vining et al., the disclosure of which is herein incorporated by reference to the extent not inconsistent with the present disclosure, with the first dope A from feed slot 14 at an interfacial region 32.

At this point, the motion of the coating surface 22 moves in one direction and carries the polymer dopes A, B from the downstream meniscus 34 to a phase inversion process step (not shown), as is known in the art. As schematically illustrated, there is a separation line 38 between the at least two dopes A, B formed proximate the down stream wall 39 of the first dope feed slot 14. Further, in the interfacial region 32, it has been observed that the interfacial dope region (region 32) illustrates a clear demarcation in pore size but the polymer structure is continuous. As shown, the coating gap 33 is adjustable and will be controlled, as is known in the art.

The resulting pore size of the each of the layers made, as shown in FIG. 1, will be predetermined by the formulation and/or thermal history of each polymer dope It is expected that viscosity will need to be controlled for the proper functioning of whichever pre-metered coating apparatus is chosen. It is also anticipated that the distance from the die slots to the receiving coating surface must be controlled. Too small a distance will result in mechanically induced shear turbulence in the uppermost polymer solution layer and too great a distance will break the membrane meniscus and lead to defects in the surface and poor control.

The process presently envisioned may involve exposing one or more of the polymer dope layers to an air gap. These exposure can occur (1) if two separate coating apparatus are used in series and (2) during the period in which the multilayer coatings are transported on the moving support from the coating step to the phase inversion step. The presently preferred approach to dealing with an air gap so as to avoid solvent evaporation and resulting skin formation consists of using a very low vapor pressure (low volatility) solvent in the polymer solution formulation. If this approach is not feasible, then the gaseous atmosphere in the air gaps may be controlled to maintain an appropriate solvent partial pressure directly above the coated polymer solutions, as is known in the art.

The above disclosure applies to those polymers, copolymers, and polymer mixtures that are capable of forming a microporous membrane by means of one or more of the well known variants of the phase inversion process, such as, for example, nylon, PVDF, PES, or polypropylene may function. It is not mandatory that the two (or more) dope layers be subject to thermal manipulation if dope formulation can alter effective pore size.

While it was initially anticipated in the parent application that a single die with multiple slots would function more effectively than separate dies, actual experience has proven that two or more single slot dies separated by a small distance have also proven to be operable. As shown by the examples, it has proven possible to use a two slot die in combination with an at least one additional slot die to make a three layer membrane and thus, four or more layer membranes appear possible as well.

Prior to the conduct of the examples below, it was believed that a single multiple slot die was needed to produce the multiple cast dope layers. Experience has proved this theory to be overly limiting according to the examples below. Using pre-metering coating apparatus for applying a second coated dope layer to form one layer of the membrane in a separate step from coating the first dope layer onto the support has avoided interfacial shear turbulence and mixing, as shown by the examples below. In addition, physically separating the casting of the dope layers in space from the phase inversion formation of the membrane has also not proven to lead to significant solvent evaporation from the first coated layer, which might lead to interlayer skin formation, provided a low volatility solvent is used.

It has now been determined, upon careful review of all the data compiled prior to the filing of the present application, that a single pre-metering coating apparatus, such as, for example, a slot die with multiple slots would be capable of achieving the desired unsupported multilayer microporous membrane structure. We have now found, after careful reflection and review of the experimental results conducted prior to the filing of the parent application, that two or more physically separated single slot pre-metering coating apparatus are also capable of producing these desired results, such as, for example, slot dies.

The one or more pre-metering coating apparatus, such as, for example, a multiple slot die would, presently preferably, be mounted vertically above a horizontal coating surface such that the polymer dope is applied downward but, conceivably other orientations could be employed and it was determined that vertical orientation of the coating surface operatively functioned to produce satisfactory unsupported multilayer membrane.

Figures 2, 3:
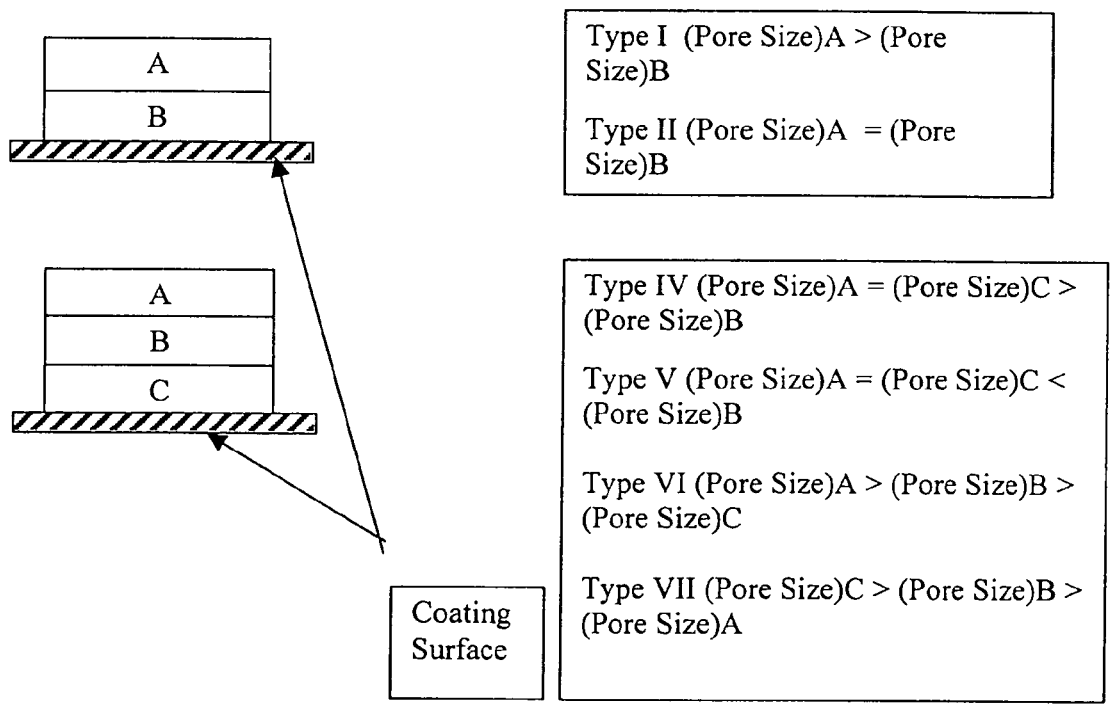
FIG. 2 is a schematic plan view of a representative membrane produced according to the present disclosure.
FIG. 3 is a schematic plan view of another representative membrane produced according to the present disclosure.

FIGS. 2 and 3 illustrate various possible embodiments of the unsupported multilayer membrane according to the teachings of the present disclosure. As shown, Type I illustrates an unsupported multilayer membrane wherein the pore sizes are different such that the larger pore size membrane would serve as an upstream protection layer for the smaller pore size membrane extending the life of the filter media.

As shown, Type II illustrates a simpler case of Type I wherein the two pore sizes are the about the same. This approach may be preferred over a single cast membrane since membrane composed of multiple coatings reduces the risk of a single defect in the single coating of a single cast membrane compromising the overall retention of the membrane. Further since by following the teaching of the present disclosure, shear turbulence during multilayer membrane production is essentially eliminated, in those applications which might require the same or nearly the same pore size but where different additives are desired present in the different layers, multilayer microporous membrane can be produced with little, if any mixing of the dopes due to shear turbulence.

As shown, Type III illustrates the reverse of Type I in the event that the reverse coating sequence confers some end-use advantage for either the upstream or the downstream side of the finished membrane.

As shown, Type IV illustrates an unsupported multilayer membrane wherein two outer larger pore-size layers sandwich a middle layer having a relatively smaller pore size. Such constructions are advantageous because the outside layers protect the inner qualification layer from damage during filter cartridge fabrication.

As shown, Type V illustrates an unsupported multilayer membrane wherein the two outer smaller pore size membrane layers sandwich a larger pore size inner or middle layer. Such a construction may provide the retention benefit of a small pore size membrane but yield a higher permeation rate than a conventional design since the inner membrane layer has a larger pore size and therefore exhibits a lower pressure drop.

As shown, Type VI illustrates an unsupported multilayer membrane wherein three layers are stacked with progressively decreasing pore size.

As shown, Type VII illustrates the situation wherein the largest pore size layer is initially positioned against the coating surface, if such location should prove advantageous.

As is apparent to anyone skilled in the art, additional dope layers to form additional membrane layers can be added up to the practical limit of membrane fabrication without substantially deviating from the spirit of the present disclosure.

In addition, we envision membranes wherein the membrane layers could be varied by properties other than pore size, such as by chemistry or molecular weight. In some cases, lower molecular weight polymers offer a high degree of functionality but do not offer strength.

A type VIII configuration could be made by producing membrane layers by combining dopes from polymers of differing molecular weight. Logically, this concept could be applied to three or more membrane layers.

A type IX membrane could be made if the dope layers varied in polymer chemistry. For example, in PVDF membrane, the relative amount of polyvinyl pyrrolidone can be varied to adjust properties. Logically, this concept could be applied membrane having three or more layers.

As is apparent to anyone versed in the art, additional membrane layers can be added up to the practical limit of membrane fabrication without substantially deviating from the spirit of this disclosure.

The following represents actual experiments conducted to verify the concept described above.

PVDF Experiments

Originally in the parent application, the following experiments were conducted to confirm the viability of the producing multilayer, unsupported microporous membrane from PVDF Polymer using post-metered casting process (knife casting). However, upon further review of the original results, the following experiments were found to demonstrate the characteristics of single and multilayer unsupported microporous membrane made using PVDF Polymer and post-metered casting process (knife casting), which were initially not appreciated.

PVDF Ingredients

The following ingredients were employed in the experiments that follow.

| Chemical | Trade name | Manufacturer | Mfg. Location |
| --- | --- | --- | --- |
| PVDF | Kynar 761 | Elf Atochem NA | Philadelphia, PA |
| IPA | 2-propanol ACS reagent | Aldrich | Milwaukee, WI |

-continued

| Chemical | Trade name | Manufacturer | Mfg. Location |
| --- | --- | --- | --- |
| NMP | 1-methyl 2 pyrrolidinone ACS reagent | Aldrich | Milwaukee, WI |

PVDF Methods

A mixture of 15%, PVDF (Kynar 761), 15% IPA (2-propanol ACS reagent) and 70% NMP (1-methyl 2 pyrrolidinone ACS reagent), with a total weight of about 200 grams, were blended and sealed into a jar with a magnetic stir bar, all of which was immersed into a jacketed beaker with the water in the jacket circulated at a predetermined temperature. A magnetic stirrer provided the mixing. The resulting dope was heated to a temperature between about 10–15° C. below the target temperature ($T_{max}$), to bring the constituents into solution.

The dope was then heated to the target temperature ($T_{max}$) via the circulating water in the jacket and held at that temperature for a minimum of about one hour.

To make single layer membrane, the dope was poured into a post-metering casting apparatus, in this case, a doctor blade with a gap setting of about 0.016 inches and pulled across a substrate, in this case, a piece of glass, at about 6 feet per minute to cast the membrane film. If a two layer membrane was made, a second dope was placed into a second doctor blade with a gap of about 0.032 inches. The second doctor blade was made wider than the first doctor blade and the back plate was raised so that the sides and back of the second doctor lade would not drag through the already cast layer of the first cast polymer dope and disrupt the first cast dope surface. There was approximately a 30 second delay between the casting of the first layer and the second layer of dope.

The glass plate with the cast polymer dope, one or two layers, was then submerged into a shallow tray containing a quench fluid of about 25% deionized water and about 75% isopropyl alcohol thereby inducing phase inversion. After about three minutes the glass plate and wet microporous membrane precursor were removed from the quench solution and transferred to rinse. The rinse consisted of a shallow tray of flowing deionized water with some overflow to help flush out impurities. The wet microporous membrane precursor was then lifted from the glass plate and allowed to rinse for a minimum of about 30 minutes to ensure complete removal of solvents. The quenched membrane was then restrained on a hemidrum in a drying fixture and dried in a convection oven at about 70° C. for about thirty (30) to about forty (40) minutes.

TABLE 1

Experiments with PVDF Membrane Made via Post-Metering Process

| ID | Membrane Construction | Avg. IPB psi | Avg. FAOP psi | Avg. Flow @ 5 psid ml/min/cm$^2$ | Thickness mils |
| --- | --- | --- | --- | --- | --- |
| 0410s67.5 | Two layers | 12 | 16.5 | 7.1 | 8.2 |
| 0410s62.5 | Two layers | 21 | 26 | 3.9 | 7.7 |
| 0228sdr67.5 | Two layers | 36.5 | 53 | 0.8 | 9.4 |
| 05081am55 | 2 layers laminate | 43 | 58 | 1.1 | 6.3 |
| 0123-62.5A-22 | single layers | 8.25 | 10.5 | 19.3 | 6.2 |
| 0223E | single layers | 22.8 | 38 | 1.1 | 7.5 |
| 0119-60A-24 | single layers | 33.3 | 38.5 | 1.5 | 6.2 |

Table 1 summarizes some of the examples of membranes prepared with sequential applications of PVDF membrane as described in the above procedure and provides a comparison between single and double layer membranes. An example of a laminated membrane is also provided wherein two separate and distinct membranes were separately cast, quenched and rinsed prior to being pressed and dried together, in accordance with one prior art process, to form the laminated sample. The controls for this example consisted of a single layer membrane. It should be noted that only a representative number of examples are presented for brevity purposes, as a number of other example experiments were actually conducted.

At a given bubble point, the expected result was that a two layer membrane would yield better flow than a single layer membrane. This expected result was based on the theory that the thickness of the relatively small pore size layer in a two layer membrane would be less than the total thickness of a single layer membrane (the value in Table 1 is total thickness) and since flow is a function of thickness, flow was expected to improve.

As will become apparent, Scanning Electron Microscope (SEM) and forward flow bubble point analysis make it clear that a two layer membrane construction was achieved. However, the anticipated improved flow for a two layer membrane relative to the prior art was difficult to compare due to variations in bubble point of the samples.

Figure 4:
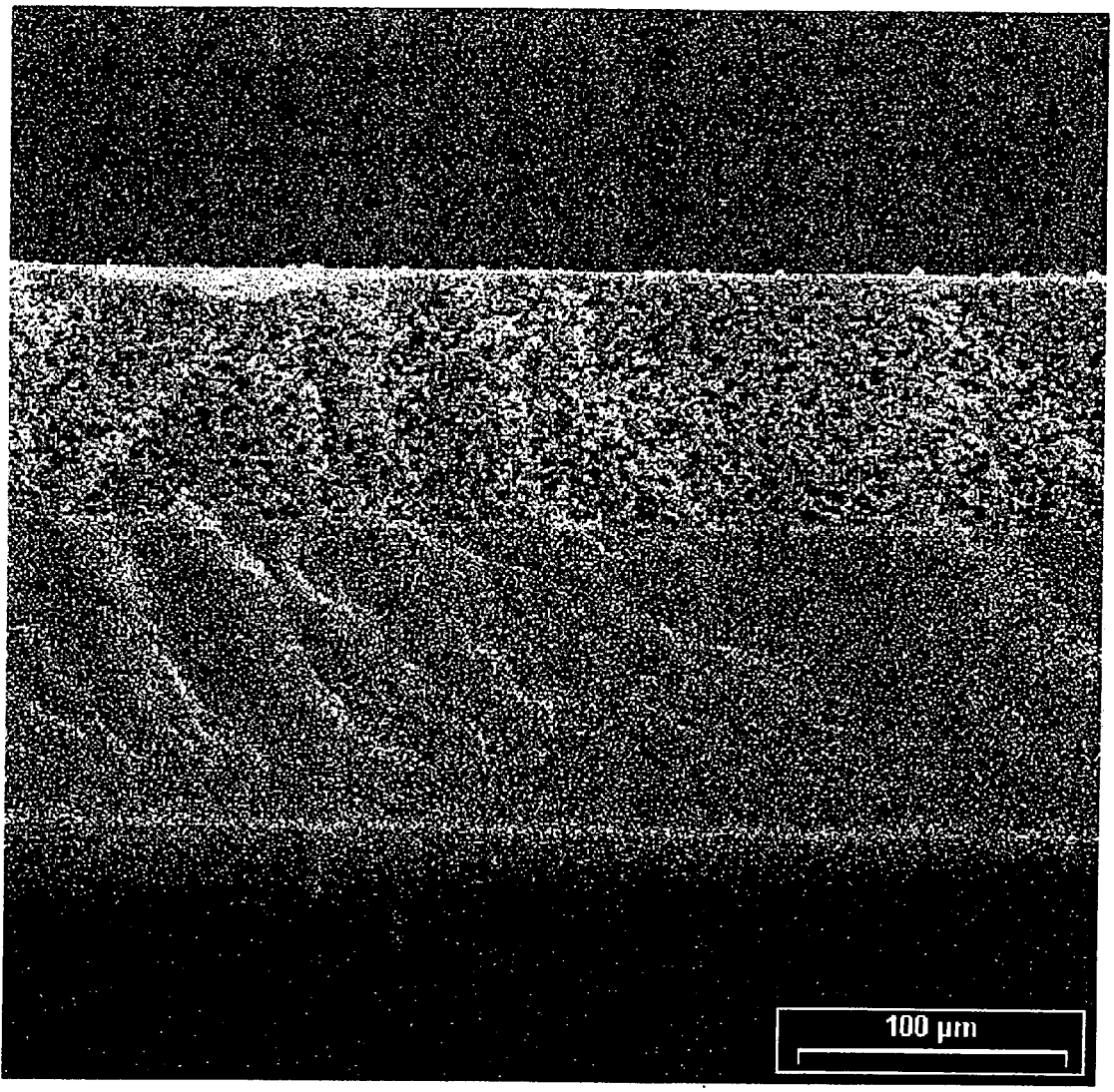
FIG. 4 illustrates a SEM cross section of an unsupported multilayer PVDF sample 0228 sd 67.5 membrane cast with a doctor blade.

FIG. 4 illustrates a cross section of an unsupported multilayer PVDF membrane cast with a dope applying apparatus, such as, for example, a doctor blade as described in the above procedure. The $T_{max}$ of the dope used to form the relatively large pore size layer was 67.5 C and the bubble point was approximately 4–5 psi in 60/40 IPA/water. The dope used to form the relatively small pore size layer had a $T_{max}$ of about 55 C and a forward flow bubble point of about 40 psi. The initial bubble point of about 36.5 psi, as shown in Table 1, was a little lower.

It is anticipated that a two layer membrane or more multilayer membrane will offer better filtration life than a single layer membrane of the same bubble point and thickness. As can be readily seen, two distinct layers having distinct pore sizes are clearly visible. Further, FIG. 4 illustrates a distinct differentiation between one pore size layer and the other pore size layer, while the membrane itself is continuous in that it has a unitary structure. Thus, FIG. 4 clearly illustrates that a multilayer unsupported microporous membrane having at least two different pore sizes can be produced, in accordance with the present disclosure.

Figure 5:
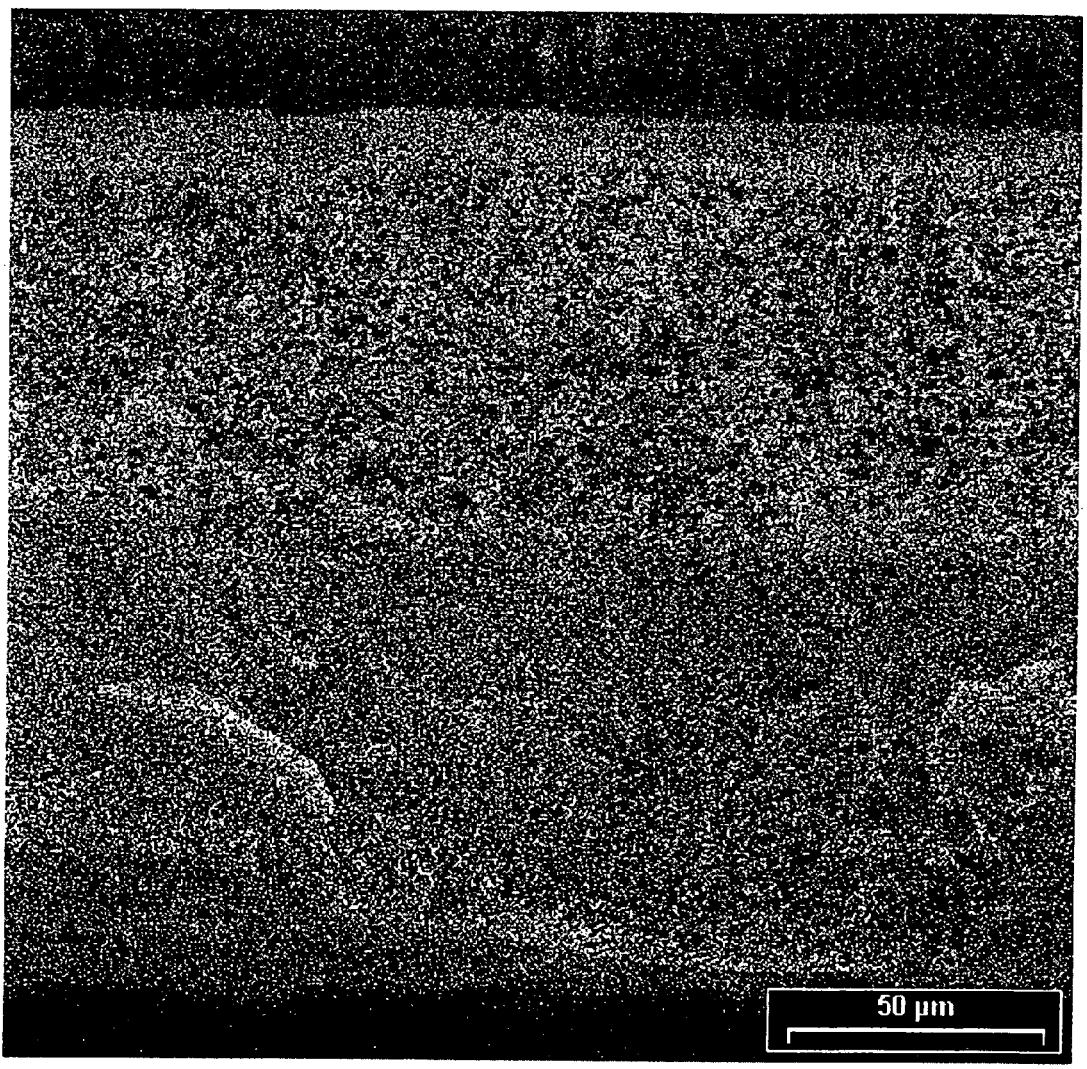
FIG. 5 illustrates a SEM cross section of an unsupported multilayer PVDF membrane sample 0410S67.5.
Figure 6:
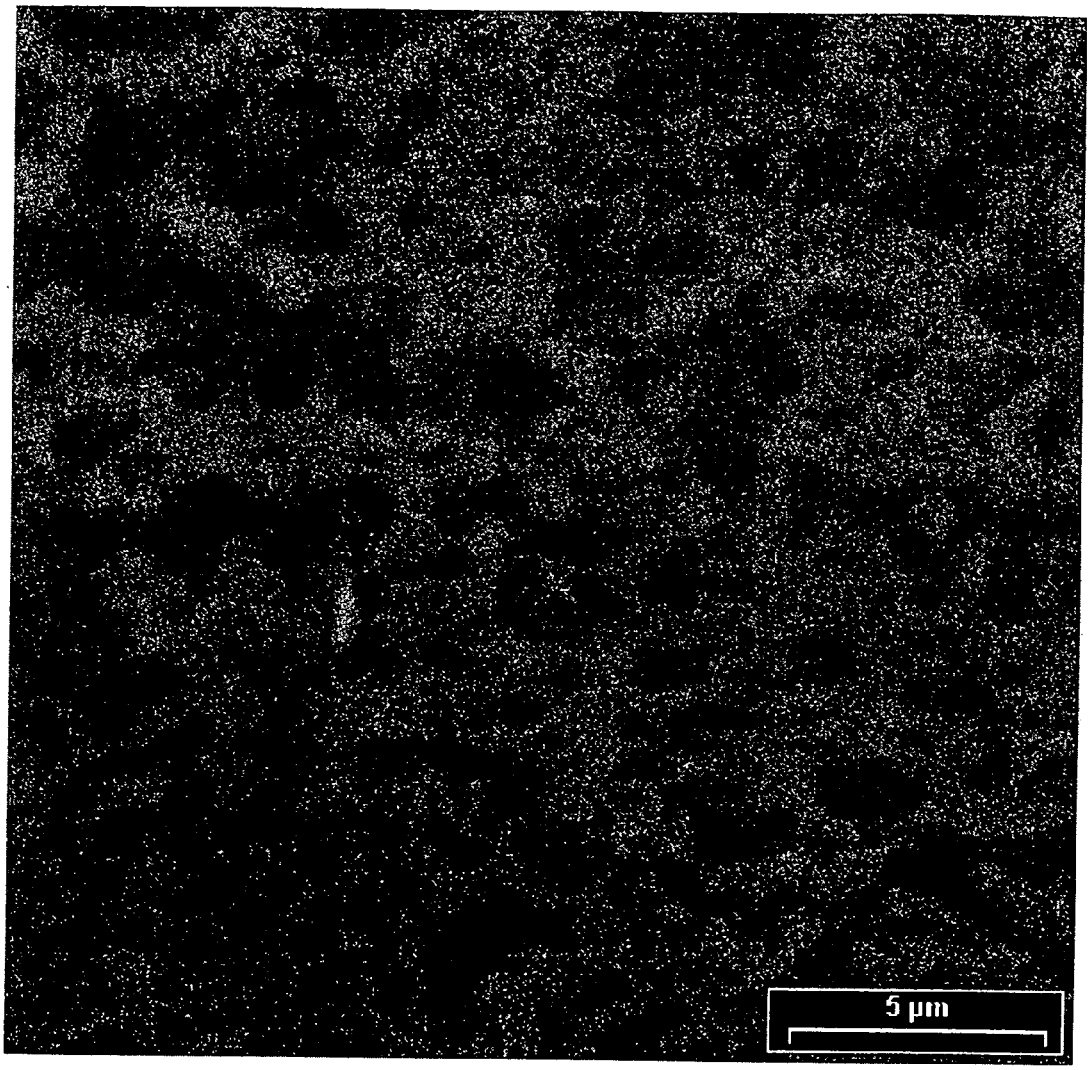
FIG. 6 illustrates a close-up of the interface of the two layers of FIG. 5.

FIG. 5 illustrates another cross section of an unsupported multilayer PVDF membrane wherein the $T_{max}$ of the dope used to produce the open or relatively large pore size layer was about 67.5° C. and the $T_{max}$ of the dope used to produce the tight or relatively small pore size layer was about 62.5° C. FIG. 6 illustrates a close-up of the interface of the two layers to show that the transition between the layers appears to be seamless, i.e., continuous. Although the pore size changes from one layer to the next, the membrane formed has a continuous interface between the two adjacent layers.

Figure 7:
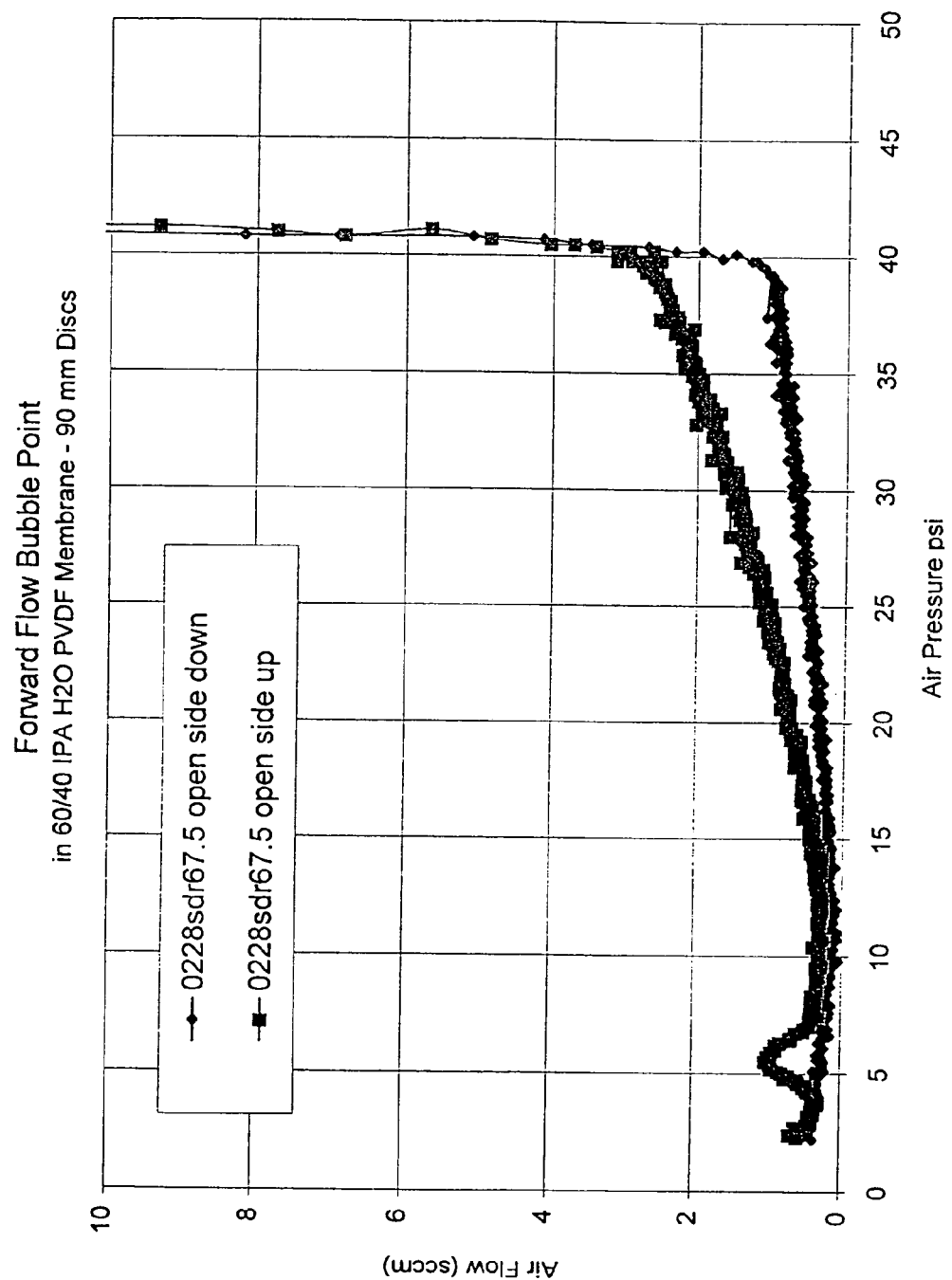
FIG. 7 illustrates two forward flow bubble point curves for sample 0228 sdr 67.5 of Table 1.

FIG. 7 illustrates two forward flow bubble point curves for sample 0228 sdr 67.5. The data for FIG. 7 was generated by testing the sample with the open or relatively large pore size side up, and then flipping the sample over and testing the sample again with the tight or relatively small pore size side up.

With the sample membrane's open or relatively large pore size side up, the rising air pressure will first clear the pores of the open or relatively large pore size layer. The fluid then clears the open or relatively large pore size layer but the tight or relatively small pore size layer underneath retains the fluid until an adequate pressure is reached to clear those pores. The mass flow meter records this first event either with a temporary increase in airflow (shown as a peak) or a permanent increase in airflow that continues at a low level below the level of bulk flow. This latter phenomenon appears to be at least partially due to the increase in diffusion flow because the gas must only diffuse through half the membrane or one layer.

While it was clear from the SEM photograph of FIGS. 5 and 6 showing sample 0228 sdr 67.5, the forward flow bubble point graph of FIG. 7 illustrates the results of a forward flow bubble point test using a much larger sample of the membrane as contained in a 90 millimeter disc. These results clearly indicated that the membrane produced and tested was a multilayer membrane, with the multilayer structure being achieved over the entire 90 millimeter disc surface area, thus, confirming that the membrane produced was, in fact, a multilayer membrane and thereby confirming that the technique of production used in the examples were both practical and effective.

Figure 8:
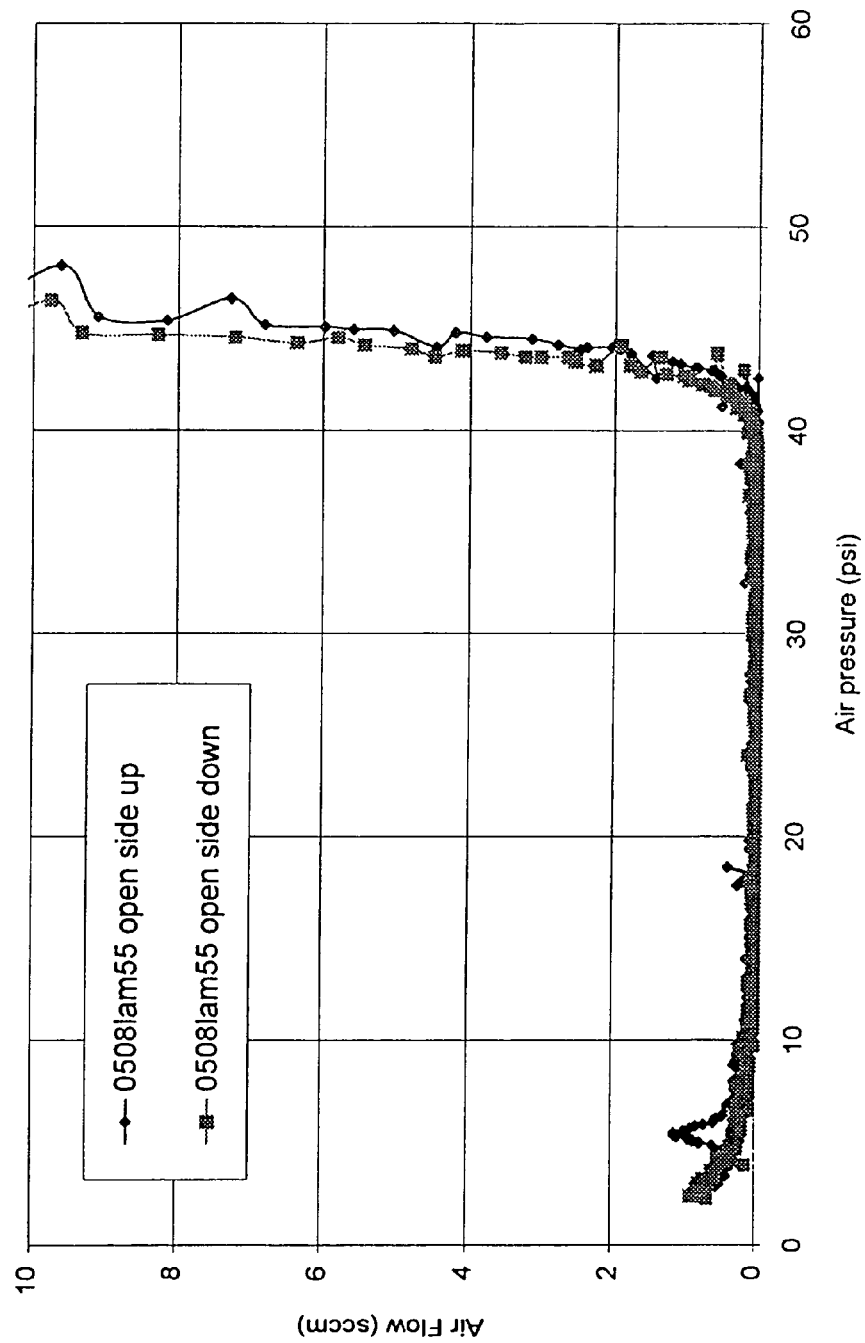
FIG. 8 illustrates a forward flow bubble point curve for a prior art laminated membrane.

FIG. 8 illustrates a forward flow bubble point curve for a prior art laminated membrane. Like the unsupported multilayer membrane of the present disclosure, this forward flow bubble point curve also exhibits the peak at 5 psi when the upper layer pore clears. Thus, it is clear from FIGS. 7 and 8 that the presence of a peak clearly indicates that a multilayer membrane is present and that the membrane of FIG. 7, when produced, was actually a multilayer membrane as compared to the control of the two separately formed pore size membranes laminated together of the prior art.

Figure 9:
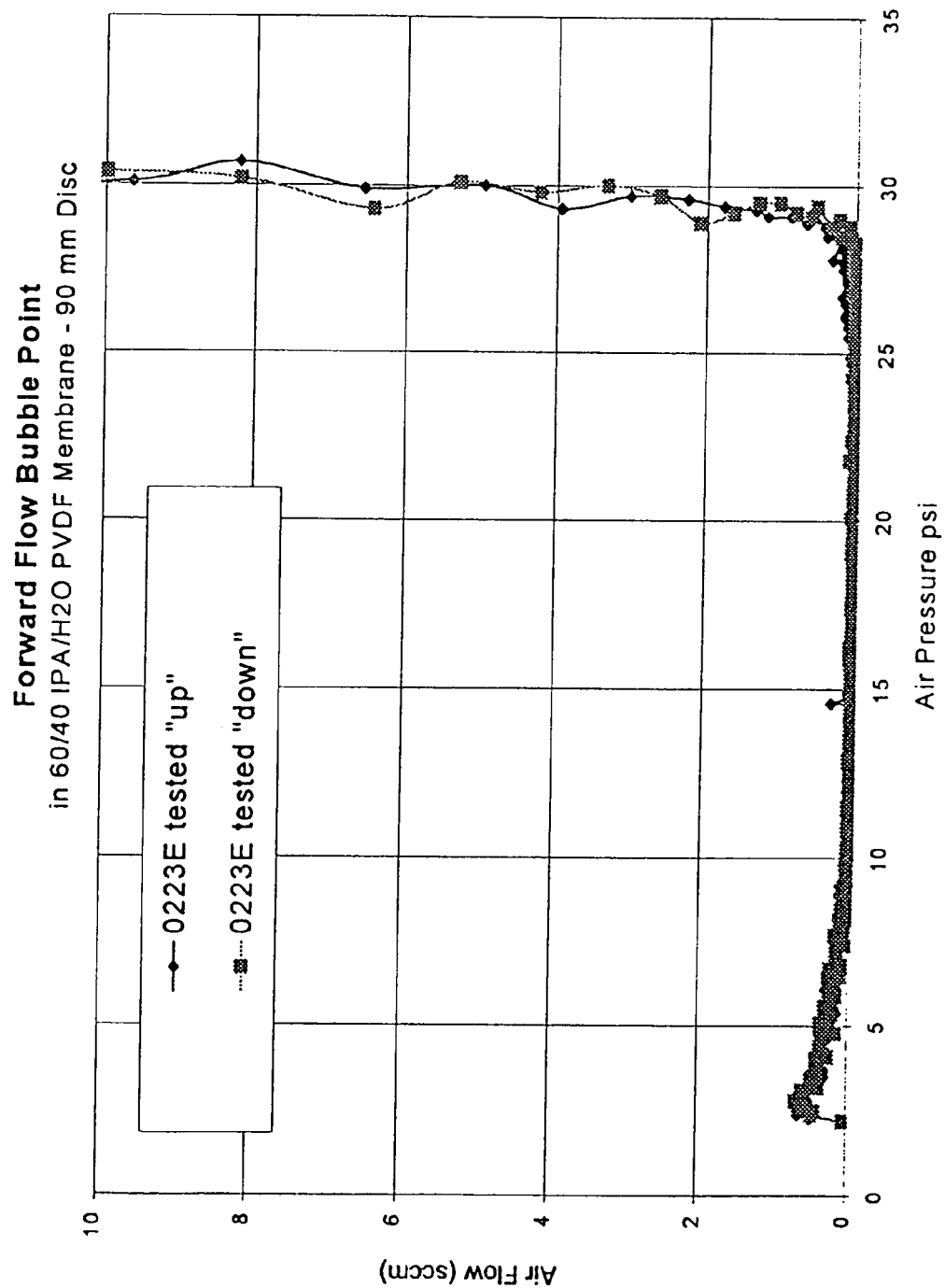
FIG. 9 illustrates a single layer forward flow bubble point curve.

FIG. 9 illustrates a single layer membrane forward flow bubble point curve. Note that the peak at 5 psi is missing regardless of sample orientation of the membrane in the test stand. There is no difference between the curves. Thus, it should be clear that there is no peak discernable from the forward flow bubble point for a single layer membrane. Therefore, the appearance of a peak in the forward flow bubble point graphs, as illustrated in FIG. 7, clearly indicates that the membrane tested was, in fact, a multilayer membrane.

Figure 10:
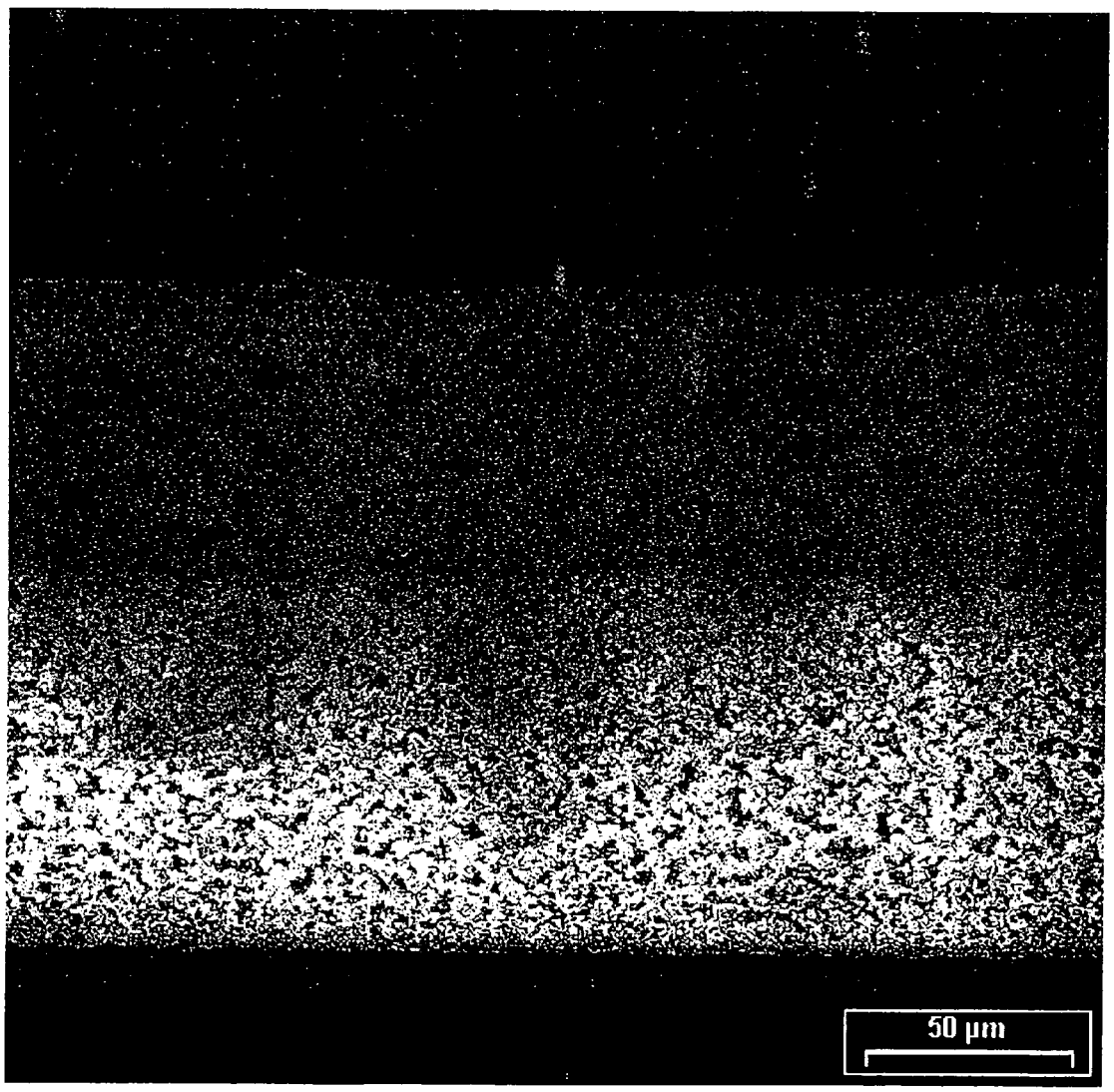
FIG. 10 illustrates a cross section of a prior art laminated PVDF membrane.
Figure 11:
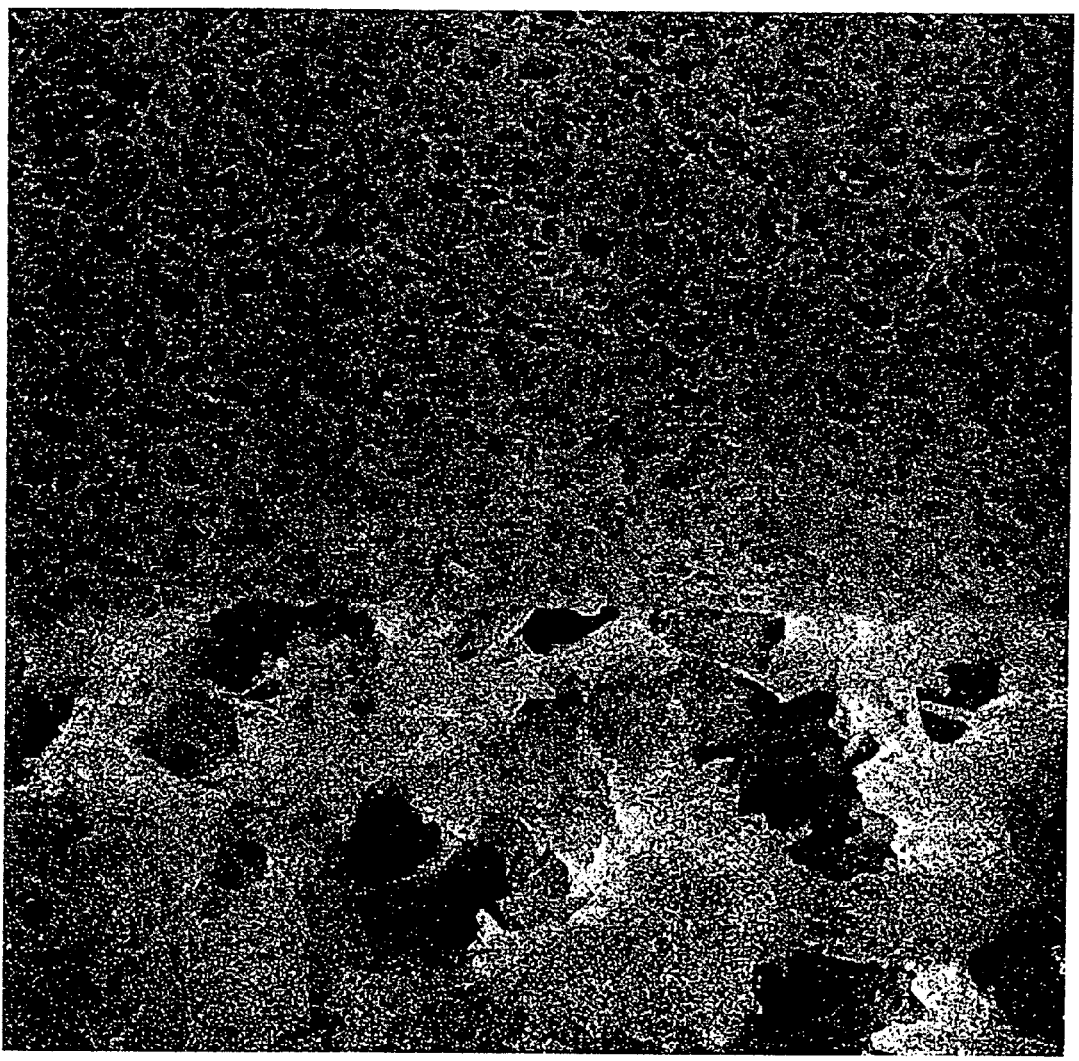
FIG. 11 illustrates a SEM close-up of the interface of the prior art laminated PVDF membrane of FIG. 10.

FIG. 10 illustrates a cross section of the laminated PVDF membrane. In the close up of the same membrane shown in FIG. 11, it is clearly ascertainable that the laminate does not form a continuous interface between the two layers, but each layer is simply pressed into place relative to the other layer. This type of bond between the layers is not as inherently strong as the continuous two layer membrane shown in FIG. 6.

The above example clearly demonstrates that multilayer unsupported microporous membrane has been produced using polyvinylidene fluoride (PVDF) according to the concepts presented in the present disclosure.

Prior to explaining the significance of the test results in terms of FEBP, FIGS. 16a–6d will be discussed. FIG. 16a illustrates a cross section of a multilayer microporous membrane 200 produced using pre-metering coating apparatus (not shown). As shown, the membrane 200 has a large pore size layer 202 and a relatively smaller pore size layer 204. As can readily be seen, the pore size distribution 206 shows a distinct demarcation line between the two layers 202, 204 at 206.

The FFBP test results of the membrane 200 is graphically illustrated in FIG. 16c and the distinct demarcation line between the two layers 202, 204 at 206 is evident by the large pore and small pore bubble points at the positions shown and the slope of the line connecting same.

FIG. 16b illustrates a cross section of a multilayer microporous membrane 200 produced using post-metering coating apparatus (not shown). As shown, the membrane 230 has a large pore size layer 232 and a relatively smaller pore size layer 234. As can readily be seen, the pore size distribution 236 shows a distinct transition zone between the two layers 232, 234 at 238.

The FFBP test results of the membrane 200 is graphically illustrated in FIG. 16d and the distinct transition zone between the two layers 202, 204 at 206 is evident by the large pore and small pore bubble points at the positons shown and the slope of the line connecting same.

Comparing FIG. 7 with FIGS. 8 and 9 however, reveals that the transition between layers, induced by the doctor blade, caused a Type II FFBP curve as illustrated in FIG. 16d and demonstrated in FIG. 7. This response was not evident when the membrane was tested in reverse. Therefore, while a doctor blade provides a continuous interface between the layers, a doctor blade also produces an asymmetric interfacial transition zone. This phenomenon is not obviously revealed by SEM but can be readily seen with a FFBP analysis. Of the various examples generated with the doctor blade, FIG. 7 represents the best performance obtained using the post-metering apparatus and all other such examples run yielded even greater differences between the slopes generated with opposite membrane orientations.

Nylon Experiments

The following experiments were conducted to confirm the viability of the producing multilayer, unsupported microporous membrane using Nylon.

Nylon Ingredients

The following ingredients were employed in the experiments that follow.

| Chemical | Trade name | Manufacturer | Mfg. Location |
| --- | --- | --- | --- |
| PET film | CI-100 500 gauge | FilmQuest | St. Charles, IL |
| Nylon 6,6 | Nylon 66Z or 66B | Solutia | St. Louis MO |
| Formic Acid | Formic Acid | BP Amoco | Cleveland, OH |
| Methanol | Methanol | Borden & Remington Chemical Co. | Fall River, MA |

Nylon Methods

Preparation of the Dopes:

Two nylon dopes were prepared using the methods described in U.S. Pat. No. 4,707,265, Example 1. The dopes were produced using about 16.0 percent by weight Nylon 66 (Solutia Vydyne® 66Z) polymer.

Process Description

Geometrically symmetric and pore size symmetric unsupported two and three layer membranes, each with their own pore structure was prepared as follows.

As illustrated in FIG. 15, a Polyester film suitable for use in the preparation of the present innovative unsupported multilayer membrane (commercially available from FilmQuest St. Charles, Ill. as part number CI-100 500 gauge), was conveyed past both a single slot (slot C) and a multiple slot die (slots A and B), with all slots (A, B and C) of the slot dies being located on the same side of the PET film at speeds of about 20 ft/min.

When three layers of dope were coated on the PET film, the dope from the first slot, (slot C), was applied at a weight of about fifteen (15) gm/sq. meter of nylon solids. The dope from the other two slots (slots A and B) was coated at a weight of about twenty (20) gm/sq. meter of nylon solids.

If only two of the slots of the two slot dies were used, the dope from both slots was coated at about twenty (20) gm/sq. meter of nylon solids regardless of which of the two dies was used. The nylon solids were provided from the dissolved nylon in the dope solution, which was, for this example, sixteen (16.0) wt. % nylon solution.

Almost immediately following the application of the first dope layer, when a dope was cast using the first die, one or two other layers were cast from the double slot die on top of the first coated layer, first with a dope that produced a different pore size and then with a second dope that produced a different pore size of the two dopes or when all three slots were used, the three dopes, as shown in Table 2 below. The distance between the slots A and B in the multislot die was about 15–20 mils. The distance between the slot of the first die and the second slot of the multislot die was about 9.5 inches.

In one representative example, the coating weight of the dope delivered from each slot of the multislot slot die was about twenty (20) gm/sq. meter of Nylon solids in about a sixteen (16.0) wt % solution. The thus coated three dope multilayer structure was then quickly brought into contact with a Marinacco-style quench solution, which simultaneously quenched the multilayer structure from the outer surface of the multilayer structure furthest from the PET film, such that a multilayer, continuous microporous membrane structure was formed.

In both the production of a two layer membrane or a three layer membrane, the quenched membrane was then washed, hand peeled from the PET film just after it was rinsed, mounted and restrained on a hemidrum and then dried. Removing membrane from the film prior to drying was found to be advantageous.

The test results are shown in Table 2 below.

TABLE 2

Results of Nylon Trials

| | | BP in 60/40 IPA/Water psi | | | |
| --- | --- | --- | --- | --- | --- |
| Sample | BP response | PET Film slot C | Middle slot B | Quench slot A | Layers |
| 0103 | predicted | 15 | 22 | 35 | |
| 0103 | actual | 12 | 23 | 29 | 3 |
| 0103 | difference | 3 | −1 | 6 | |
| 0107 | predicted | | 15 | 35 | |
| 0107 | actual | | 15 | 30 | 2 |
| 0107 | difference | | 0 | 5 | |
| 0110 | predicted | | 15 | 22 | |
| 0110 | actual | | 15 | 19 | 2 |
| 0110 | difference | | 0 | 3 | |
| 0111 | predicted | 15 | 22 | | |
| 0111 | actual | 15 | 19 | | 2 |
| 0111 | difference | 0 | 3 | | |
| 0206 | predicted | 15 | 22 | | |
| 0206 | actual | 15 | 21 | | 2 |
| 0206 | difference | 0 | 1 | | |
| 0207 | predicted | 15 | 22 | 35 | |
| 0207 | actual | 18 | 18 | 24 | 2 |
| 0207 | difference | −3 | 4 | 11 | |
| 0209 | predicted | | 22 | 15 | |
| 0209 | actual | | 20 | 16 | 2 |
| 0209 | difference | | 2 | −1 | |

Table 2 illustrates attribute testing of the unsupported multilayer nylon membrane produced as described above. Most samples were run as two layer membrane and provided a two layer microporous membrane structure as evidenced by the forward flow bubble point curves, which show higher diffusion rates when the upper layer of pores have cleared, and SEM photographs. The unsupported multilayer structure was evident whether the dies were run in sequence or simultaneously. The samples identified above as 103 was run as a three layer membrane.

Figure 12:
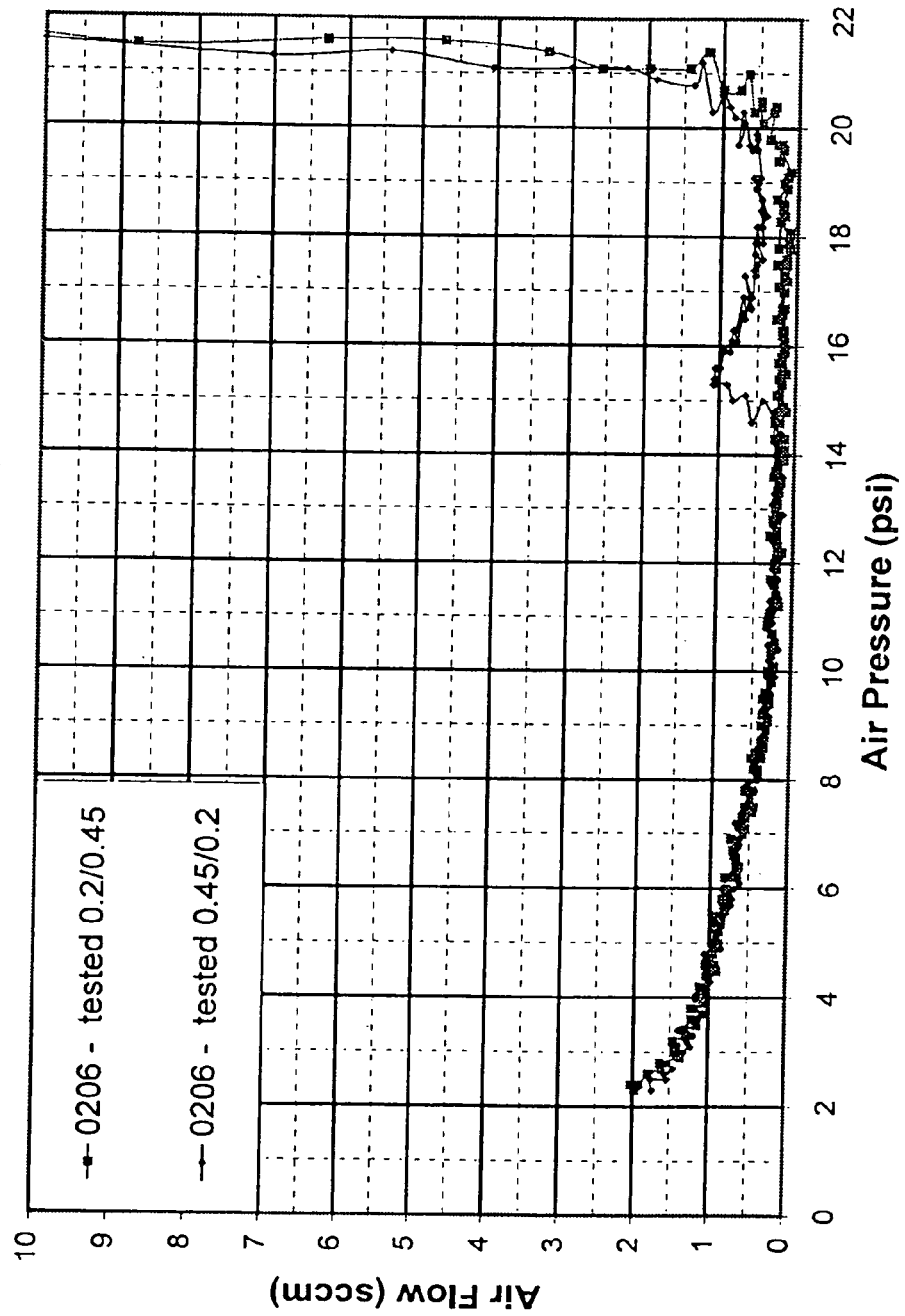
FIG. 12 illustrates a forward flow bubble point curve for nylon membrane sample 206 of table 2.

FIG. 12 show forward flow bubble point curves for nylon membrane wherein pressure is ramped continuously on a membrane wetted with about 60% IPA and about 40% water and the flow was monitored with a mass flow meter. As is known, flow is a measurement of either diffusion through the wetted membrane or bulk flow through the cleared pores or a combination.

When a membrane consisting of a single layer was tested, the response curve was independent of orientation, as illustrated above for the PVDF membrane. However, when an unsupported, multilayer membrane of the present disclosure was tested, the response curve differed, depending on whether the larger pore size layer was upstream or downstream relative to the smaller pore size layer. If the larger pore size layer was upstream, when the pressure necessary to clear those pores was reached (the bubble point), the larger pore size layer suddenly cleared. At this point, the liquid will progress down until the smaller pore size layer just beneath the larger pore size layer is reached. However, once the pores of the larger pore size layer has cleared, the diffusion response also increased because the air no longer must diffuse through the entire depth of the membrane, but only through half of the membrane, the smaller pore layer.

On a forward flow bubble point (FFBP) curve, this transition causes an increase in the mass flow response. If a membrane, was tested with the relatively smaller pore size layer toward the air interface, then the pores will not clear until the relatively smaller pores have reached their bubble point, at which time the entire membrane clears. Since the membrane remained fully wetted during the entire test, the diffusion does not increase during the latter part of the test.

This difference is best illustrated in FIG. 12 wherein two curves are displayed for the same membrane sample. As shown, when tested with the relatively larger pore size layer upstream, the mass flow rose above the baseline at the bubble point of the relatively larger pore size upstream layer but did not experience bulk flow until the relatively smaller pore size pores were cleared as well.

Figure 13:
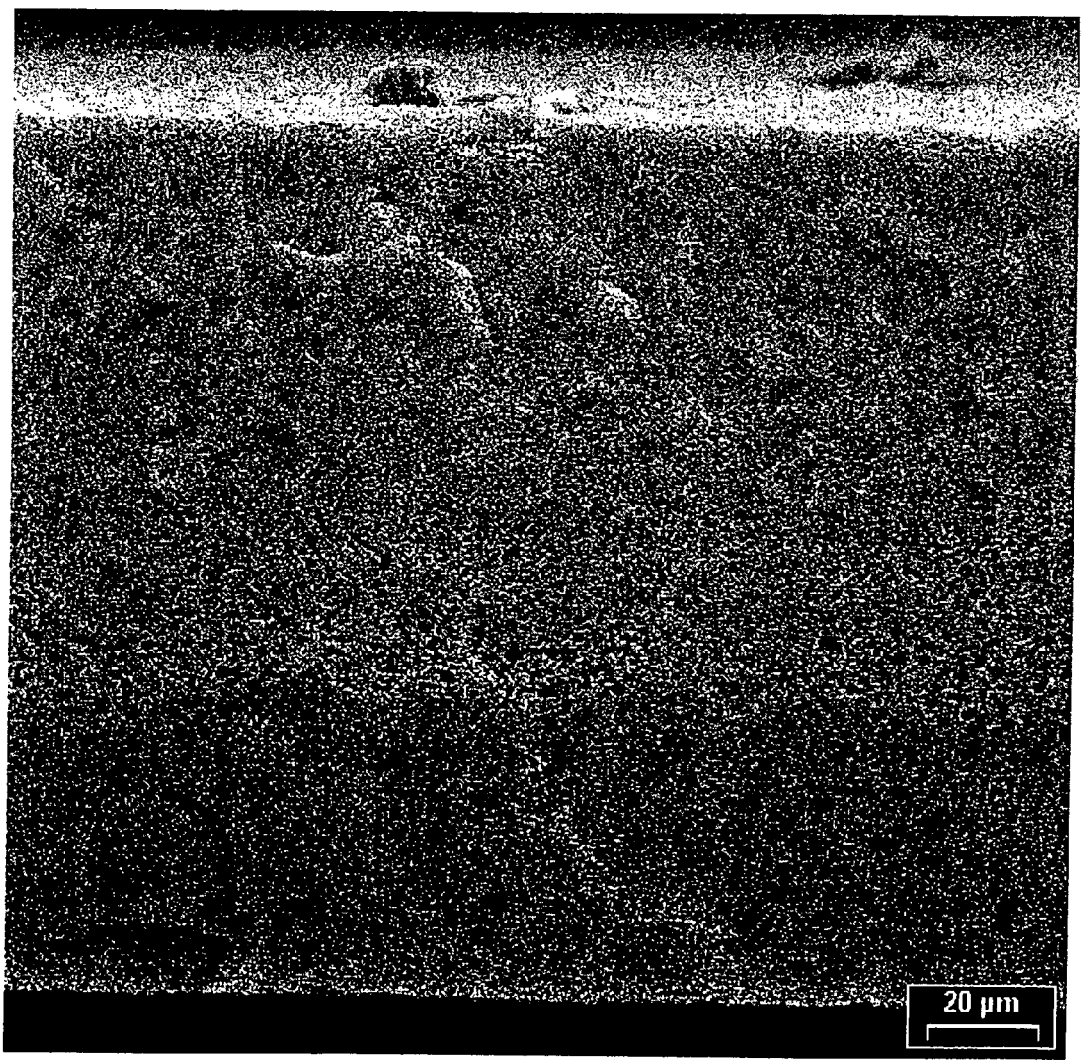
FIG. 13 illustrates a SEM cross section of membrane sample 0103 of table 2.
Figure 14:
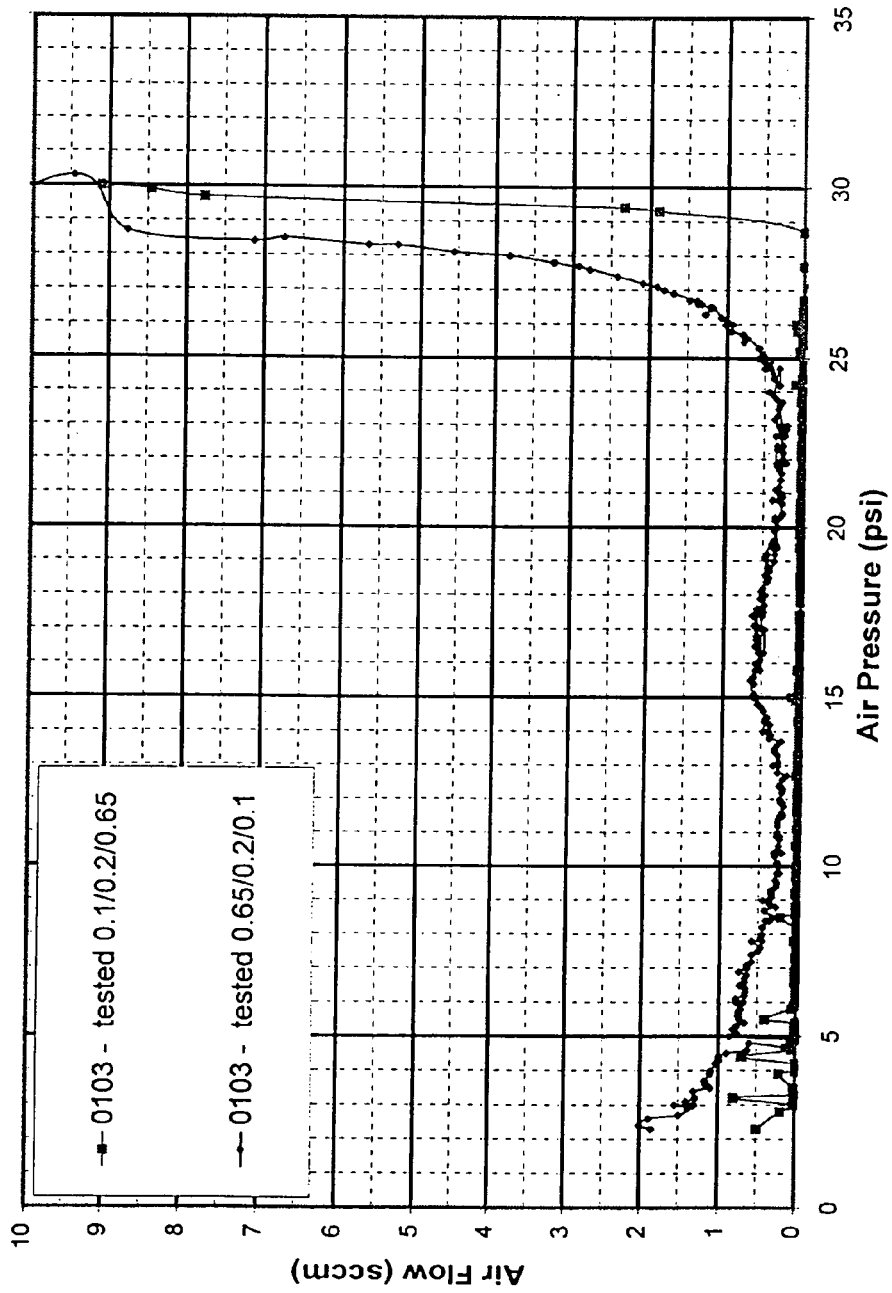
FIG. 14 illustrates a forward flow bubble point curve for nylon membrane sample 0103 of table 2.

Membrane sample 103 was a three layer membrane. As can be determined from both the SEM photograph of FIG. 13 and the forward flow bubble point curve of FIG. 14, three distinct membrane layers can be ascertained. The first layer was measured at about 13 psi from the curve generated with the open or relatively large pore layer upstream. This measurement can be seen as a significant rise above the baseline curve, which is generated with the tight or relatively small pore layer upstream. The second layer cleared at a pressure of about 24 psi, where the curve once again rises above the baseline. The third layer is not apparent in the curve where the open or relatively large pore layer side was placed upstream in the test. However, the third layer is apparent at 29 psi in the baseline curve when that same piece of membrane was flipped over and tested.

FIG. 15 schematically illustrates one possible representative apparatus that could be used with one possible representative method to produce the innovative multilayer, unsupported membrane of the present disclosure.

As shown, the apparatus, similar to that disclosed in U.S. Pat. No. 6,090,441 to Vining et al., the disclosure of which has been previously been incorporated by reference herein, includes a casting or coating surface, PET film, used as the base upon which the dopes are deposited by a series of slot dies, a single die and then a multiple die, it being understood that other die or dope applying apparatus arrangements could be used, as well as different coating surface orientations, as long as the interfacial shear turbulence and interlayer mixing are eliminated or minimized and the innovative unsupported, multilayer membrane is successfully produced.

Prophetic Example PES Membrane

PES Composition Ingredients

The following ingredients are employed in the composition of PES dope.

| Recipe 1 (approximately 0.4 μm pore size) | |
|---|---|
| Chemical | Amount |
| Poly ether sulfone | 14% |
| 1-methyl 2 pyrrolidinone | 18% |
| Poly ethylene glycol 400 | 66% |
| water | 2% |

| Recipe 2 (approximately 0.8 μm pore size) | |
|---|---|
| Chemical | Amount |
| Poly ether sulfone | 13% |
| 1-methyl 2 pyrrolidinone | 19% |
| Poly ethylene glycol 400 | 67% |
| water | 1% |

PES Methods

Two PES dopes are prepared per recipes 1 & 2 by mixing the components of each dope in separate agitated, jacketed tanks. Each dope is heated, under agitation to about 70° C. for about two hours and then cooled to ambient temperature.

Process Description

As illustrated in FIG. 15, a polyesterPolyester film (commercially available from FilmQuest St. Charles, Ill. as part number CI-100 500 gauge) suitable for use in the preparation of the present innovative unsupported multizone membrane, is conveyed past both a first slot (slot C) and a second slot die (either slots A or B), with all slots (A, B and C) of the slot dies being located on the same side of the PET film at a speed of about 1 ft/min.

When two layers of dope are coated on the PET film, the dope from the first slot, (slot C), is applied at a weight of about twenty (20) gm/sq. meter of polyether sulfone solids. The dope from the other slot (either slots A or B) is coated at a weight of about twenty (20) gm/sq. meter of polyether sulfone solids.

The distance between the slots A and B in the multislot die are about 15–20 mils. The distance between the slot of the first die and the second slot of the multislot die is about 9.5 inches.

The coated two dope multilayer structure is then brought through a humidification chamber for about 15 to about 20 minutes where the humidity is initially about 90% and gradually drops to about 50% at the end of the chamber. The dope will be in the form of a phase inverted membrane when exiting the chamber that is not yet washed and dried.

In the production of a two zone unsupported membrane the nascent membrane is then rinsed, separated from the PET film just after the rinse, and then is dried.

Thus, it is clear from the above that the present disclosure discloses innovative apparatus, methods and membrane that solve the prior art difficulties with the production of unsupported, multilayer microporous membrane.

While the articles, apparatus and methods for making the articles contained herein constitute preferred embodiments of the disclosure, it is to be understood that the disclosure is not limited to these precise articles, apparatus and methods, and that changes may be made therein without departing from the scope of the disclosure which is defined in the appended claims.

What is claimed is:

1. A multilayer, unsupported, microporous membrane comprising:
    a first layer having a symmetrical distributed first pore size; and at least a second layer having a symmetrically distributed second distinct pore size, the first and second layers being connected at the interface between the first and second layers such that the membranes are continuous.

2. The multilayer membrane of claim 1 wherein the first layer is formed from a first polymer dope for producing one pore size and the at least a second layer is formed from at least a second polymer dope for producing at least one different pore size.

3. The multilayer membrane of claim 1 wherein the polymer dope comprises:
    nylon.

4. The multilayer membrane of claim 1 wherein the polymer dope comprises:
    polyvinylidene fluoride.

5. The multilayer membrane of claim 1 wherein the polymer dope comprises:
    polyether sulfone.

6. The multilayer membrane of claim 1 wherein the multilayer membrane has a type I configuration.

7. The multilayer membrane of claim 1 wherein the multilayer membrane has a type III configuration.

8. The multilayer membrane of claim 1 wherein the multilayer membrane has a type IV configuration.

9. The multilayer membrane of claim 1 wherein the multilayer membrane has a type V configuration.

10. The multilayer membrane of claim 1 wherein the multilayer membrane has a type VI configuration.

11. The multilayer membrane of claim 1 wherein the multilayer membrane has a type VII configuration.

12. The multilayer membrane of claim 1 wherein the multilayer membrane has a type VIII configuration.

13. The multilayer membrane of claim 1 wherein the multilayer membrane has a type IX configuration.

14. A two layer, unsupported, microporous membrane comprising:
    a first layer having a symmetrically distributed first pore size; and a second layer having a symmetrically distributed second distinct pore size, the first and second layers being connected at the interface between said first and second layers such that the two layer membrane is continuous.

* * * * *

UNITED STATES PATENT AND TRADEMARK OFFICE
CERTIFICATE OF CORRECTION

PATENT NO. : 6,994,789 B2  Page 1 of 1
APPLICATION NO. : 10/771801
DATED : February 7, 2006
INVENTOR(S) : Richard Sale It is certified that error appears in the above-identified patent and that said Letters Patent is hereby corrected as shown below:

Column 8, line 64 - delete "16a-6d" and insert --16a-16d--;

Column 14, line 60 (Col. 1, Table 1) -- delete "05081am55" and insert --0508lam55--;

Column 16, line 57 - delete "16a-6d" and insert --16a-16d--.

Signed and Sealed this

Seventh Day of November, 2006

JON W. DUDAS
*Director of the United States Patent and Trademark Office*